United States Patent [19]
Baugher et al.

[11] Patent Number: 5,802,995
[45] Date of Patent: *Sep. 8, 1998

[54] PLANTING UNIT

[76] Inventors: Roger Dale Baugher; Garreth Dean Baugher, both of P.O. Box 79-A, McClure, Ill. 62957

[*] Notice: The term of this patent shall not extend beyond the expiration date of Pat. No. 5,595,130.

[21] Appl. No.: 785,653

[22] Filed: Jan. 17, 1997

Related U.S. Application Data

[63] Continuation-in-part of Ser. No. 384,660, Feb. 6, 1995, Pat. No. 5,595,130.

[51] Int. Cl.$^6$ ............................................. H01C 5/06
[52] U.S. Cl. ............................. 111/52; 111/170; 111/140
[58] Field of Search .......................... 111/52, 140, 164, 111/167, 134, 137, 157, 197, 927; 172/430, 536, 538

[56] References Cited

U.S. PATENT DOCUMENTS

| | | | |
|---|---|---|---|
| 1,873,128 | 8/1932 | Johnson | 111/140 X |
| 4,031,834 | 6/1977 | Klenke | 111/195 |
| 4,090,456 | 5/1978 | Morrison, Jr. et al. | 111/140 X |
| 4,196,679 | 4/1980 | Moore . | |
| 4,570,554 | 2/1986 | Clark . | |
| 4,653,410 | 3/1987 | Typpi . | |
| 4,714,033 | 12/1987 | Neumeyer . | |
| 4,760,806 | 8/1988 | Bigbee et al. | 111/195 X |
| 4,796,550 | 1/1989 | Van Natta et al. . | |
| 4,883,126 | 11/1989 | Leland . | |
| 5,595,130 | 1/1997 | Baugher et al. | 111/52 |
| 5,619,939 | 4/1997 | Herman et al. | 111/195 X |

OTHER PUBLICATIONS

7500 Series Grain Drill Operator's Manual, John Deere Des Moines Works, 1992.
Great Plains Product Catalog, Great Plains Manufacturing, Inc. (No date).
Tye 2000 Notill Systems Catalogs, Tye Company, 1994.

(List continued on next page.)

*Primary Examiner*—Michael J. Carone
*Assistant Examiner*—Robert Pezzuto
*Attorney, Agent, or Firm*—Haverstock, Garrett & Roberts

[57] ABSTRACT

A planting unit utilizing a single disk opener supported for rotation about a horizontal axis offset at a small angle from the transverse direction for opening a furrow. A seed tube assembly is located adjacent the rearward facing side of the disk and includes a runner extending forwardly of the lower portion of the seed tube for holding loose soil out of the furrow in advance of seed or other material deposited therein, the runner being located in the shadow of the disk so as not to significantly contact or disturb the side of the furrow. The opener is mounted on an arm which is pivotable about a relatively low point so as to be oriented at a relatively flat angle with respect to the ground and to maintain the general orientation of the opener as it moves through the soil throughout the range of pivotal movement of the arm. The planting unit can include one or more pivotable press wheels which can be mounted for pivotal movement about the same axis as a pivotable gauge wheel adjusting arm. The press wheels preferably include a relatively narrow first press wheel which travels in the bottom of the furrow for firmly pressing seed or other material into the bottom of the furrow, and a second press wheel having a double beveled edge that can be adjustably positioned and oriented for precise placement of soil into covering relation to the seed or other material.

23 Claims, 17 Drawing Sheets

OTHER PUBLICATIONS

Tye Folding Drills, Type Company, Product Brochure, 1990.

Crustbuster All–Plant Drill, CrustBuster Speed King, Inc., Product Brochure. (no date).

Crustbuster Procision 4000 Section Grain Drill, Crustbuster Speed King, Inc., Product Brochure, 1994.

Grain Drill, Case International, Product Brochure (No date).

Plainting & Seeding, Case International, Product Brochure, 1994.

Premier 1575 No Till Drill, Duratech Industries International, Inc., Product Brochure (No date).

No–Till Grain Drill, Krause Corporation, Product Brochure, 1994.

Grain Drills, Krause, Product Brochure. (No date).

No–Till and Conventional Grain Drills, Marliss Division, Sukup Manufacturing Company (No date).

John Deere Drills Catalog (No date).

Barton No Till Disk Seeding System Brochure, Barton No Till Disk Seeding System Mfg. Inc., 2 pgs, no date.

Barton No Till Disk, Inc. Seeding System Brochure, Barton No Till Disk Seeding System Inc., 2 pgs, no date.

Article, Angled Disk Openers Cut Through Straw and Hard Soil, Oct. 1994 Grain News, 1 page.

The Future in Seeding Tor–Master the Revolutionary Air Drill Brochure, Tor–Master Mfg. Ltd., 2 pgs, (no date).

New No–Till Disk Seeding System, Farm Show, vol. 18, No. 4, 1994, 2 pgs.

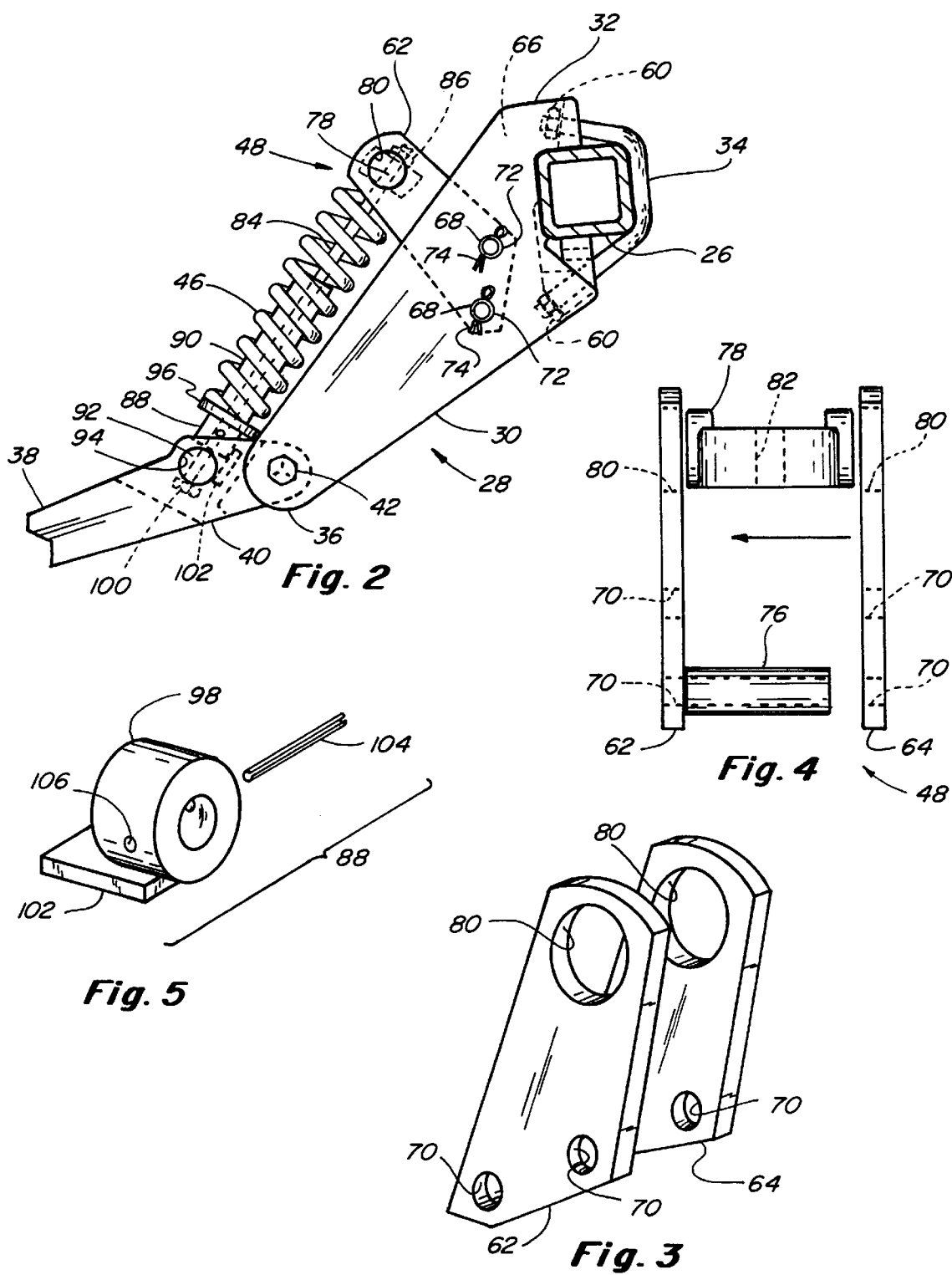

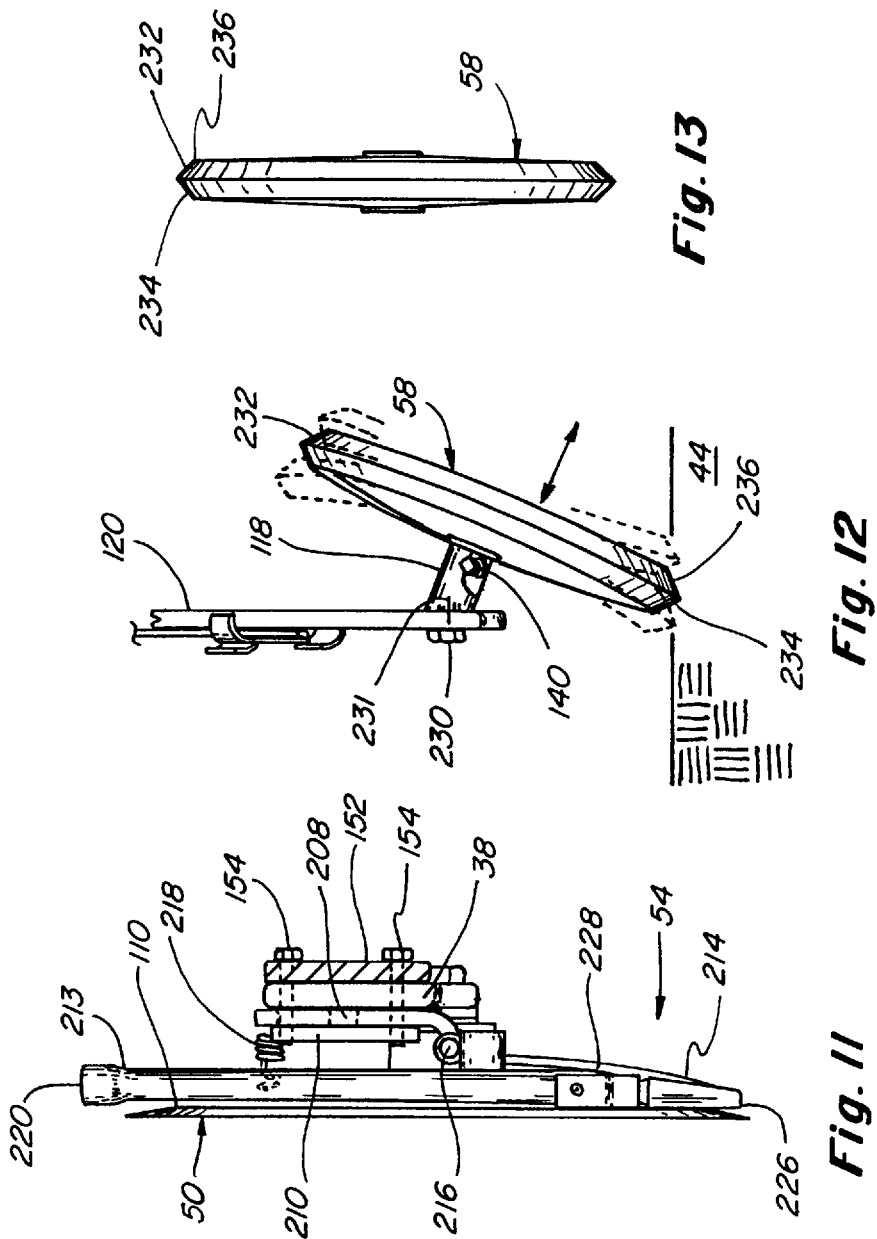

PLANTING UNIT

This is a continuation-in-part of application Ser. No. 08/384,660, filed Feb. 6, 1995, now U.S. Pat. No. 5,595,130.

BACKGROUND OF THE INVENTION

The present invention relates generally to planting units for forming a trench or furrow in the ground and depositing seed therein, and more particularly, to a single disk planting unit adapted for opening a relatively narrow furrow in the soil and precisely placing seeds, grains or other materials in the furrow, which unit is adapted to be used in closely spaced side by side relation with other planting units, and which unit is adapted for use in a wide range of tillage conditions including conventional till, minimum till, and some no till applications, as well as in wet soils and other troublesome applications.

Tilled soil conditions generally fall along a continuum that can be loosely divided into three categories. At one end of the continuum is the above-mentioned category known as conventional till which generally includes tillage conditions wherein the soil is worked into a garden-like condition before planting. Conventional till is loose and crumbly and has little intact plant residue, sometimes called "trash", present on the surface. A middle category is minimum till wherein the soil is only lightly tilled prior to planting. In minimum till, the soil is firmer and some intact plant residue is present when the next crop is planted. The third category, located at the opposite end of the continuum from conventional till, is no till, wherein the soil remains largely undisturbed after harvest, and the next crop is planted among standing weeds, remaining plant root structure, and other trash. Of the three general categories, conventional till is the oldest and most widely used. However, minimum till and no till, often together called conservation till, are becoming increasingly popular.

An important problem encountered when planting in conventional and minimum till is the frequent presence of several inches of loose soil on the surface of the ground which can fall into a furrow formed by a planting unit in advance of seeds, grains or other material being deposited therein so as to result in non-uniform placement of the material in the furrow. Also, many known planters, drills and opener units tend to plow or push this loose top soil to the side, such that the displaced soil interferes with the operation of adjacent units. This is particularly problematic where adjacent units are positioned in a staggered fore/aft arrangement as the forward units can actually push soil into the path of the aft units making their operation more difficult and the aft units can push soil over the seed or other material planted by the forward units such that as a result that seed or material is planted too deep.

Conservation till provides advantages over conventional and minimum till including less chemical loss and redistribution, less erosion, and other benefits, but because the soil has been worked less, it is more difficult to penetrate to plant in and known implements for planting in conservation till typically utilize relatively high down pressure to penetrate the surface of the soil and form a relatively wide furrow. This requires a heavier implement which is more costly, and pulling the heavier conservation implements, particularly through firm soil, roots and trash, requires relatively large horsepower tractors which are themselves heavy and are known to cause soil compaction problems. The larger tractors are also costly. Additionally, the known conservation till planting units are all relatively wide and thus do not facilitate placement in closely spaced relation, particularly closely spaced side by side relation, because trash has been found to become easily lodged between the units and collect there so as to disrupt the function and effectiveness of the units, instead of flowing between the units. This material flow problem is also present when the units are staggered as explained above. Staggered conservation units likewise can cause the same soil displacement problems discussed above.

Some soil types have been also found to be problematic for known opener units, such as river bottom soils including heavy, silty components, known as "gumbo" soils, found in areas such as the Mississippi river valley region of southern Illinois and elsewhere. One reason for this has been the observation that these soils tend to fracture and fragment easily, thus making it difficult to open the soil without breaking it up. Other problem soils include sandy loams which can be extremely fine and almost fluid-like making it difficult to form a narrow, controlled furrow and deposit seed in the bottom of the furrow before it is covered with soil. Also, known opener units can become mired in the soil if it is too wet, resulting in delays that can reduce crop yields.

On attempted solution for overcoming the above discussed shortcomings of staggered forward and aft opener units is to set the forward units to plant at a shallower depth than the aft units. However, this does not work in all cases, and in some cases the front openers may have to be locked in an up, non-planting position, which is less productive and for obvious reasons is inconvenient. Another problem with staggered units is that if the staggered units are to be mounted on a single tool bar, the forward and aft units will require different mounting hardware, thus increasing their cost.

OBJECTS OF THE INVENTION

It is therefore an object of the present invention to provide an improved planting unit for conventional till and other applications which forms only a very narrow furrow or trench in the soil and thereby disrupts less soil for better moisture and nutrient preservation, less chemical loss and redistribution, and less erosion when planting. Another object is to provide a planting unit that can be used in wet soils. It is yet another object to provide a planting unit for conventional till which requires less horsepower for pulling and can be used at faster operating speeds. Still another object is to provide a planting unit for conventional till which has at least some utility in conservation till.

It is another object of the present invention to provide an improved planting unit that enables a drill to plant in relatively narrow rows without using staggered opener assemblies. Another object is to provide a planting unit which forms a relatively narrow furrow and holds loose soil out of the furrow long enough to enable seed or other material to settle in the bottom of the furrow. Another object is to provide a planting unit that more precisely places seed or other material in the furrow.

Another object is to provide a planting unit that is easy to adjust for planting depth and down pressure. Another object is to provide a planting unit having down pressure that only minimally affects planting depth in softer soils.

Another object of the present invention is to provide an improved planting unit for conventional till and other applications which provides better planting characteristics more economically than at least most prior art planting units, and which is also easier to lubricate and service.

These and other objects and advantages of the present invention will become apparent after considering the following description of the invention in conjunction with the accompanying drawings.

SUMMARY OF THE INVENTION

In accordance with the above objects, the present invention overcomes many of the shortcomings and limitations associated with using known planting unit constructions and teaches the construction and operation of several embodiments of a planting unit which opens a narrow furrow or slit in the soil, and precisely deposits seed, fertilizer, or other matter in the furrow with only minimally disturbing the soil. The present unit can be of relatively lightweight construction and requires substantially less horsepower to pull through conventional till and conservation till compared to known planting units. The present planting unit is also relatively narrow, enabling forming closely spaced rows without requiring a staggered arrangement.

The present planting unit construction includes an improved opener assembly utilizing a single at least generally flat disk blade supported in a substantially vertical attitude for rotation about an axis which is slightly angled with respect to the transverse direction, that is, the direction transverse to the forward direction of travel of the unit, at about 5°, although somewhat larger or smaller angles could be used, the angle selected depending on the application. The opener further includes an adjustable gauge wheel to enable setting different disk penetration depths, and a seed tube assembly including a boot or runner member. In several preferred embodiments of the invention, the gauge wheel provides the capability that regardless of the gauge wheel adjustment, the bottom portion of the gauge wheel is always located in close proximity to the region where the disk edge exits the ground, which helps maintain the integrity of the adjacent side of the furrow and is important as will be explained. The seed tube boot or runner is located in the furrow adjacent the opposite side in position to prevent loose soil from falling into the furrow long enough to enable seed to be deposited in the bottom region of the furrow, but does not act to significantly firm or form the furrow. The seed tube boot or runner is designed for less drag, and preferably further includes means for better preventing clogging of the seed tube outlet.

The opener is supported utilizing a pivotable arm assembly, one preferred assembly including a lower arm member which is pivotally attached to an upper arm member. The upper arm attaches to the rock shaft, tool bar or cross beam on the implement frame and extends downwardly and rearwardly therefrom terminating at the pivot point for the lower arm member. Importantly, the pivot point of this preferred assembly is substantially lower compared to known units, which results in the lower arm member being oriented at a much flatter angle. This is an important advantage of this assembly because it enables a greater degree of pivotal movement of the lower arm member without substantially changing the relationship of the opener with respect to the soil, thereby limiting adverse effects on planting depth and seed tube outlet clogging. According to another preferred embodiment, the lower arm member carries a bearing assembly at least largely internally for rotatably supporting the disk, which internal bearing assembly enables the unit to have an overall narrower width so that units can be more closely spaced together. According to an alternative preferred embodiment, the disk bearing is carried on a member located in a cavity of the gauge wheel, which is also a more compact assembly widthwise. Other opener improvements include a gauge wheel that facilitates the flow of soil and trash between adjacent units and a seed tube boot or runner that does a better job cleaning the surface of the disk and which better prevents the build up of trash between the disk and the opener frame.

The present planting unit further preferably includes furrow closing means located in trailing relation to the opener assembly, which closing means include a narrow first press wheel capable of following along the bottom of the seed furrow and pressing the seed firmly into the bottom of the furrow, and a rearwardly positioned second press wheel or closing wheel of relatively lightweight construction including a specially double beveled edge portion for placing soil over the deposited seed. Other improvements include optional spring means associated with the respective press wheels which can be adjusted more quickly and easily than known constructions, and which require no tools for adjustment. The rear press wheel angle and position are also adjustable for fine tuning soil coverage. In several embodiments, the two press wheels are pivotably mounted in coaxial relation with the mounting means for the gauge wheel for improved and easier lubrication and servicing. Additionally, the present invention can include adjusting means for the gauge wheel which provide more precise adjustment and planting depth.

BRIEF DESCRIPTION OF THE DRAWINGS

FIG. 2 is an enlarged fragmentary side elevational view of the opener arm assembly of the unit of FIG. 1;

FIG. 3 is an enlarged perspective view of the upper spring bracket members of the opener arm assembly shown in FIG. 2;

FIG. 4 is an enlarged rear view of the bracket members of FIG. 2 showing an upper spring retainer and a spacer member of the opener arm assembly in association therewith;

FIG. 5 is an enlarged perspective view of a lower spacer assembly which forms a part of the opener arm assembly of FIG. 2;

FIG. 11 is a rear view of the seed tube assembly of FIG. 6;

FIG. 12 is an enlarged rear view of the second press wheel and associated arm member of the unit of FIG. 1;

FIG. 13 is an end view of the press wheel shown in FIG. 12;

DESCRIPTION OF THE PREFERRED EMBODIMENTS

Figure 1:
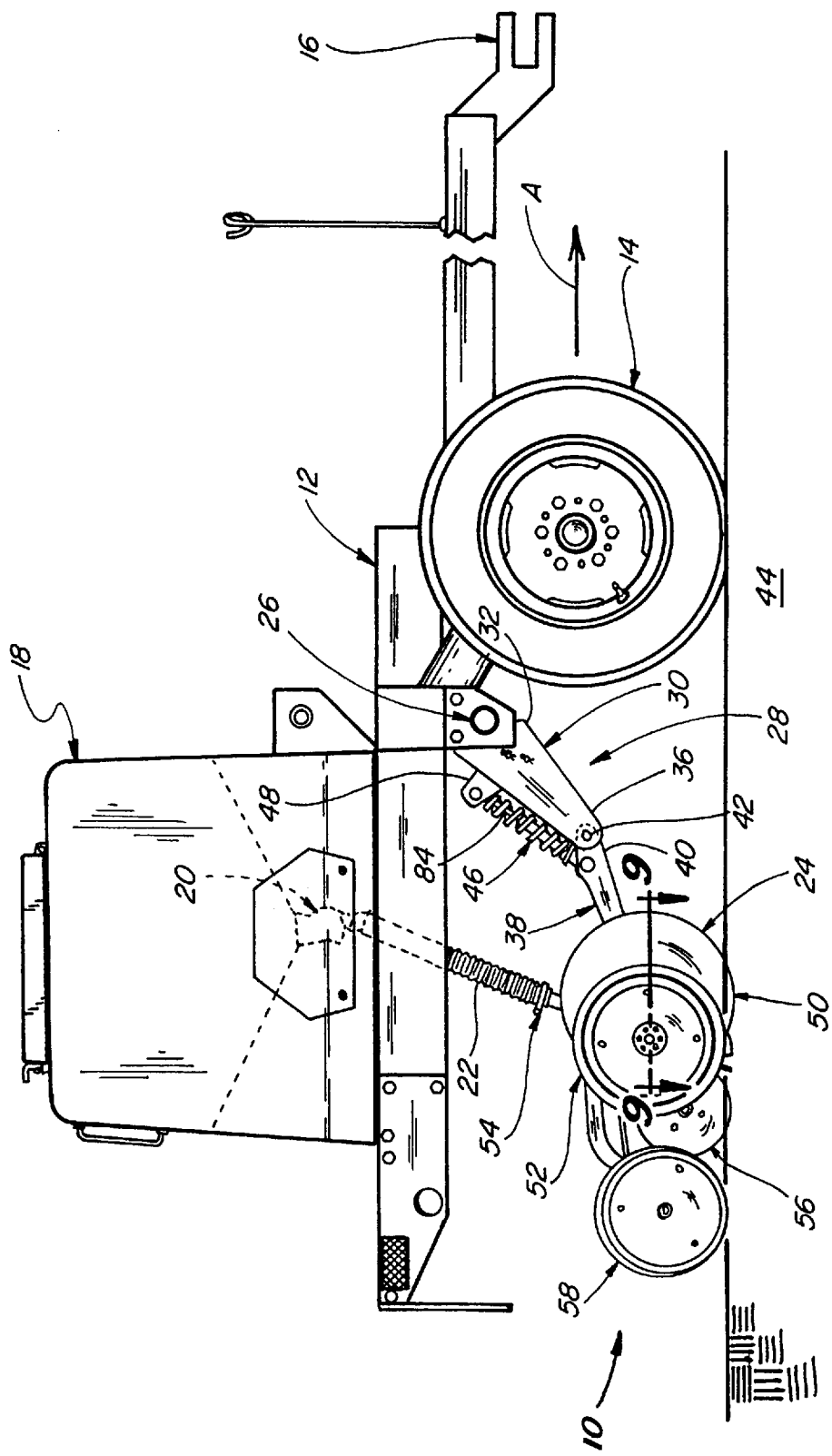
FIG. 1 is a side elevational view of a planting unit according the present invention mounted on the rockshaft of a typical prior art planting implement, which unit is a right hand unit, and is shown in the field position in engagement with the ground.

Referring now to FIG. 1, there is shown a planting implement 10 having a main frame 12 supported for forward movement in the direction indicated by the arrow A by wheels 14. The planting implement 10 includes a forward hitch 16 adapted for connection to a towing vehicle such as a tractor. A hopper or seed box 18 is mounted on main frame 12 and is adapted for receiving and discharging material such as seed, grain or fertilizer to metering means 20 and then to hoses 22 through which the seed or other material can flow to opener assemblies 24 constructed according to the present invention. The opener assemblies 24 are mounted in side by side relation on a rockshaft 26 rotatably mounted on frame 12. The implement 10 can include any number of opener assemblies 24 corresponding to the width of the implement, and the opener assemblies should include an equal number of right hand units (shown) and left hand units (e.g., FIG. 6) so as to equalize side draft forces acting on the implement. Further, although a planting implement 10 is shown, the opener assemblies 24 may be used with other implements, such as an air seeder in which case the assemblies 24 may be mounted at a number of locations on the seeder frame 12. The opener assemblies 24 form narrow furrows of uniform depth in the soil and precisely deposit the metered seed or material discharged from the hopper 18 into the furrows, as will be explained.

The opener assemblies 24 are each mounted for pivotal movement relative to rockshaft 26 on an opener arm or draw bar assembly 28 which also forms part of the invention. The opener arm or draw bar assembly 28 includes an elongated upper arm member 30 having a first end portion 32 which is fixedly attached to rockshaft 26 using U-bolts 34 secured into position with nuts 60 (FIG. 2), and an opposite second end portion 36 which is generally located rearwardly and below first end 32 depending on the orientation of the rockshaft, as will be explained. A lower arm or draw bar 38 on which the opener assembly 24 is mounted has a forward end portion 40 pivotally attached to lower end portion 38 of upper arm 30 by flange bolt 42. Although any suitable pivotal attachment means could be used here, the pivotal attachment means shown include a hollow pin (not shown) with the end outside diameters tapered and split bushings (not shown) with matching tapers. When the flange bolt 42 is tightened through the bushings and the hollow pin, it causes the bushings to expand as they slide on the hollow pin. The bushings and pin become tight in the upper arm 30 and minimize the looseness of the lower arm 38 thus maintaining more accurate positioning of the angled disk blade 50 under side loading. In operation, with opener assembly 24 in its field position engaged with the soil 44 as shown, lower arm 38 will be oriented at an acute angle with respect to horizontal of from about 0° to about 20°, which is an important feature of the present invention as discussed below. The lower arm 38 furthermore is resiliently biasable downwardly by a compression spring member 46 having one end pivotally attached to the lower arm 38 and a second end pivotally attached to an upper spring bracket assembly 48 on the upper arm 30. Opener assembly 24 generally includes a rotatable disk 50 for forming a furrow; a rotatable gauge wheel 52 for controlling furrow depth; and a seed tube assembly 54 for receiving seed from the hose 22 and depositing the seed into the furrow. Closing means shown in association with the opener assembly 24 include a first press wheel 56 for pressing the seed into the furrow; and a second press wheel 58 for covering the seed with soil.

FIG. 2 shows the upper portion of opener arm assembly 28 in greater detail. In particular, the attachment of upper arm 30 to rockshaft 26 utilizing U-bolt 34 threadedly engaged with nuts 60 is shown. The upper spring bracket assembly 48 is also shown. Referring also to FIGS. 3 and 4, upper spring bracket assembly 48 includes a pair of bracket members 62 and 64 preferably of plate metal construction, which brackets extend in parallel, spaced relation upwardly and rearwardly from a cavity 66 formed in the upper arm member 30 which is preferably of cast metal construction, although tubular construction or a weldment could also be used. The bracket members 62 and 64 are secured in position on upper arm member 30 using pin members 68 which pass through holes 70 in the bracket members 62 and 64 and through holes 72 in the upper arm 30. The pins 68 are retained in position in their respective holes using cotter keys 74 for ease of assembly and disassembly. The spacing between the members 62 and 64 is maintained using tubular spacer 76 in association with one of the pins, which spacer is of predetermined length. The upper end of spring 46 is pivotally mounted to the brackets 62 and 64 and retained by an upper spring retainer 78. Retainer 78 is preferably of cast metal construction and includes opposed disk shaped ends mounted for pivotal movement in holes 80 extending through bracket members 62 and 64. Upper spring retainer 78 has a central bore 82 extending therethrough, which bore 82 slidably receives a spring guide rod 84 which extends axially through spring 46. Rod 84 is used to raise and support lower arm 38 and the associated opener assembly 24 when the unit is in the raised or transport position, and also acts to guide the movement of spring 46. The upper end of rod 84 is threadedly engaged with a nut 86 for retaining rod 84 in central bore 82 when the opener is not engaged with the ground. Spring 46 is maintained in generally coaxial relation with rod 84 by an annular spring guide member 90 which is of a predetermined length selected to limit the maximum upward axial travel of rod 84 by engagement with upper spring retainer 78, and thus the upward pivotal movement of lower arm 38 with respect to upper arm 30. The lower end of rod 84 passes through a lower pivot pin 92 mounted for pivotal movement in holes 94 extending through a bifurcated portion of forward end portion 40 of lower arm 38 which is preferably a cast metal member, although again, other constructions could likewise be used. The lower end of spring 46 is engaged by an annular washer 96. Washer 96 is maintained in spaced relation to lower pivot pin 92 by an annular spacer assembly 88, both of which member 96 and assembly 88 receive rod 84 through a central bore therethrough. Rod 84 furthermore includes an enlarged head or nut 100 on the lower end thereof to prevent disengagement of rod 84 from pivot pin 92 when raising and supporting the lower arm. Referring to FIG. 5, annular spacer assembly 88 also prevents relative rotation between rod 84 and lower arm 38, and includes a spacer 98 and a plate member 102 welded to the outer surface of the spacer, which assembly is positionable in the bifurcated portion of the upper end 40 of lower arm 38 for preventing rotation of the spacer therein. A roll pin 104 installed in holes 106 through the spacer 98 and also through a transverse hole extending through rod 84 (not shown) prevents rotation between the rod 84 and the spacer. Roll pin 104 also prevents rod 84 from falling through the spacer assembly 88 when the unit is in the field position with the spring compressed, for smoother pivotal operation of the drag arm assembly.

Referring again to FIG. 1, opener assembly 24 is shown in its down or field position engaged with the soil 44. In this position, spring 46 will usually be in some state of compression, which compression in combination with the weight of the unit provides downwardly directed pressure to enable disk 50 to open a furrow in the soil. This downwardly directed pressure can be lessened or increased to varying degrees by rotation of rockshaft 26 which affects compression of the spring. For instance, rotation of rockshaft 26 in the clockwise direction will provide less compression of the spring so as to lessen down pressure, whereas rotation in the counterclockwise direction will increase pressure. Rotation of the rockshaft is hydraulically controlled in the conventional manner (not shown). In conventional till, since the ground will be generally loose and easy for the disk 50 to penetrate, little or no hydraulically directed down pressure may be required, and in many cases the weight of the opener assembly 24 will provide down pressure sufficient to open the desired furrow.

Figure 6:
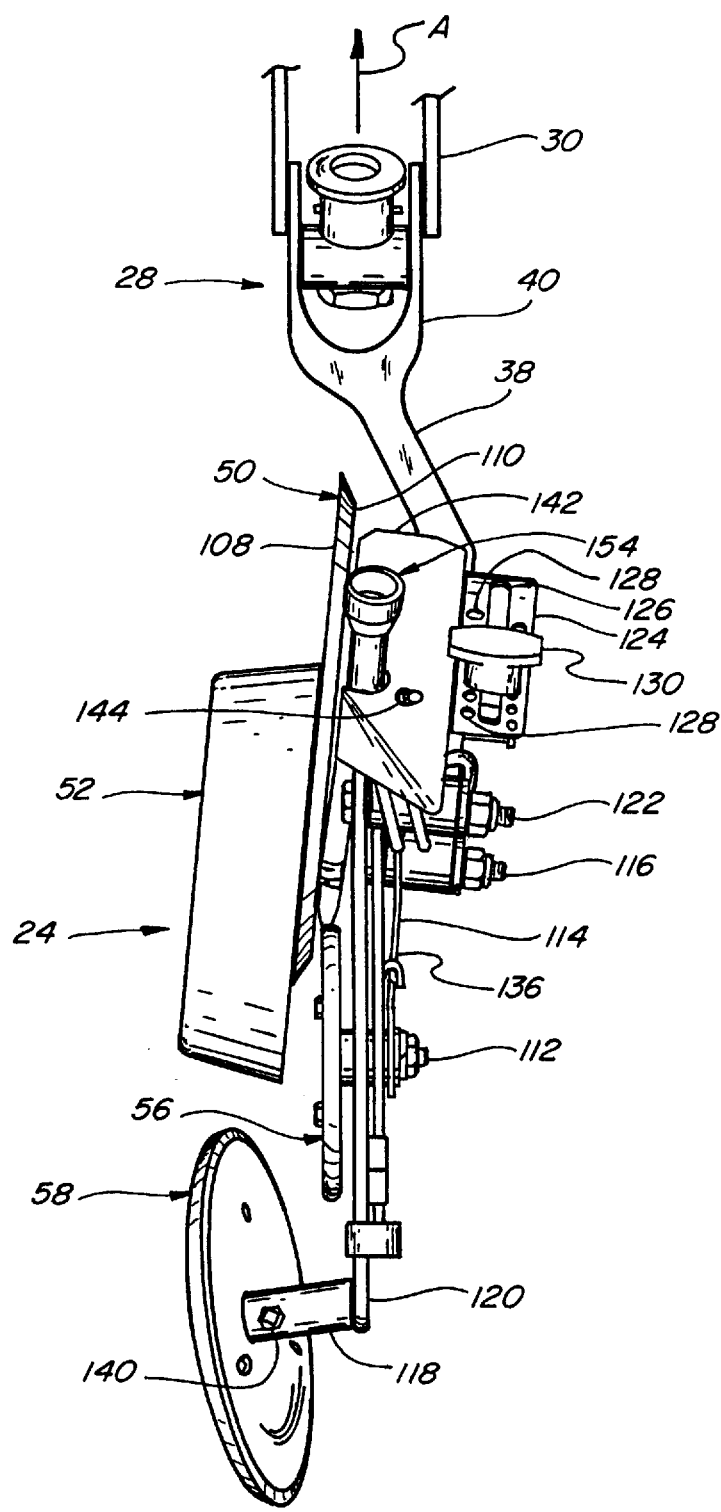
FIG. 6 is a top view of a planting unit according to the present invention, which unit is the same as the unit of FIG. 1 except that it is a left hand unit, showing the orientation of the various wheel members and the curved shape of the lower arm member of the unit.

FIG. 6 shows an opener assembly 24, which is the same as that of FIG. 1 except that it is a left hand model. That is, it is the same except that it faces the opposite direction. Again, the forward direction is indicated by the arrow A. This view shows the bifurcated forward end portion 40 of lower arm 38, as well as a bend in the shape of the arm which orients the axis of disk 50 and gauge wheel 52 at a small offset angle with respect to the direction transverse to the forward direction A. An offset angle from about 4° to about 6° has been found to work well in most conventional till applications and an angle of about 5° is preferred. The offset angle is important as it positions surface 108 of disk 50 in a slightly forward orientation with respect to the direction of travel whereas opposite disk surface 110 faces slightly rearwardly, the same being true for the corresponding surfaces of gauge wheel 52. With opener assembly 24 in its field position and being moved in the forward direction, disk 50 turns through the soil and opens a furrow or trench corresponding in shape to the forwardly facing profile of that portion of the disk engaged with the soil, the depth of the trench or furrow being determined by the position of the bottom of gauge wheel 52 with respect to the bottom of the disk, as will be shown. Gauge wheel 52 additionally serves to control or limit soil disruption on the side of the furrow formed by the forward face 108 of the disk.

Figure 7:
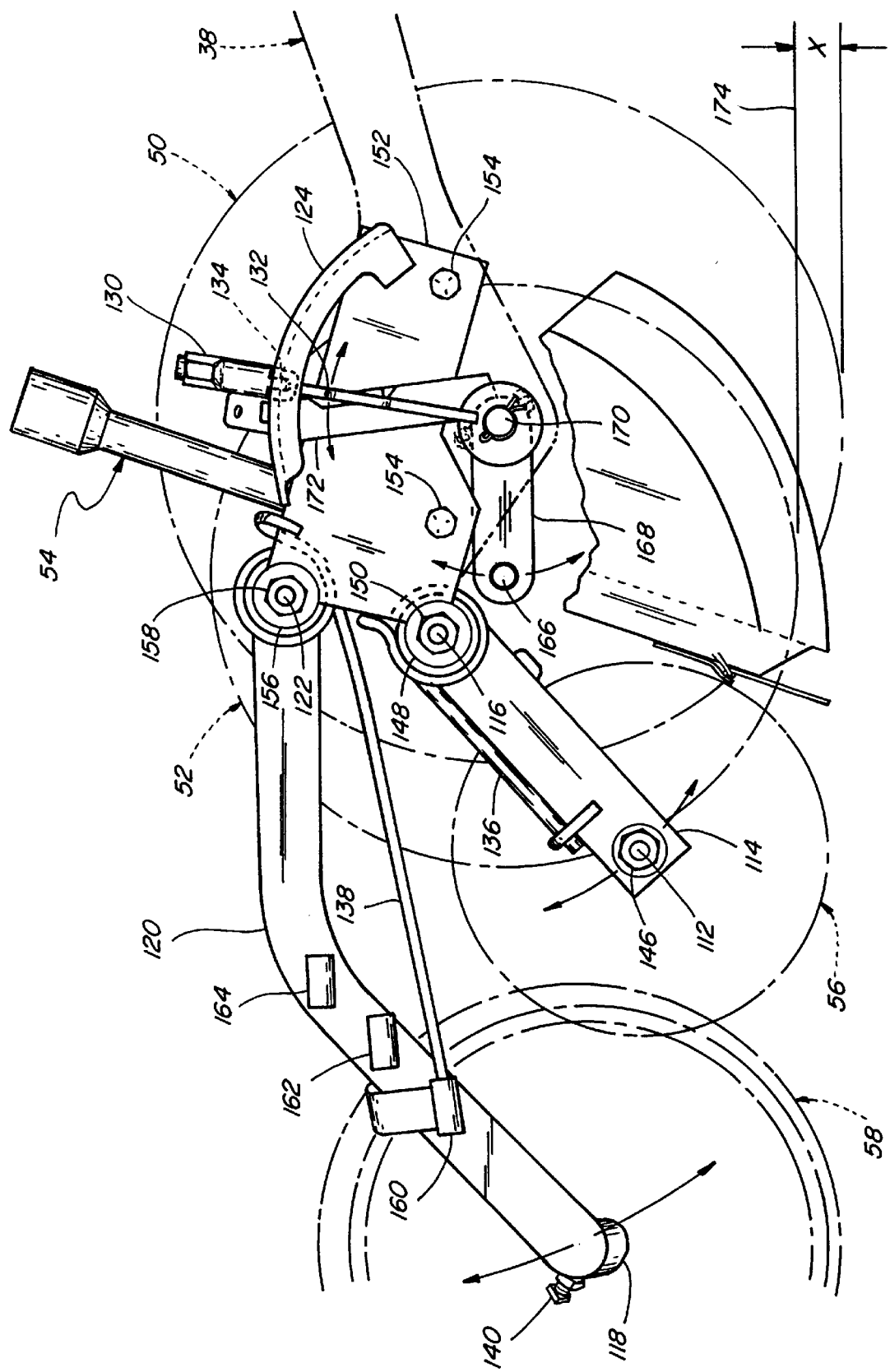
FIG. 7 is a right side elevational view of the planting unit of FIG. 6, showing the various wheel members and the lower arm member of the unit in phantom lines.

First press wheel 56 of the closing means is located rearwardly of disk 50 and is mounted for rotation about spindle 112 located adjacent the rearward end of a first closing wheel arm 114, the forward end of which is mounted for pivotal movement in the direction shown in FIG. 7 about spindle 116 mounted adjacent the reward end of lower arm 38. First press wheel 56, importantly, is sufficiently narrow so as to be able to follow in the bottom of the trench or furrow formed by disk 50 and positively press seed discharged by seed tube assembly 54 into the bottom of the furrow. A press wheel 56 of lightweight, stamped metal, non-pneumatic construction having a width of no more than about ½ inch has been found to work best. Second press wheel 58 is similarly mounted for rotation on a short transverse arm 118 mounted adjacent the rear end of second closing wheel arm 120, the forward end of which arm 120 is mounted for pivotal movement in the direction shown in FIG. 7 about spindle 122 also mounted adjacent the rearward end of lower arm 38. Second press wheel 58 can be positioned to follow along the gauge wheel side of the furrow to move soil into covering relation to the seed furrow, as will be discussed.

Other components of opener assembly 24 include a quadrant 124 mounted adjacent the rearward end of lower arm 38. Quadrant 124 has an elongated slot 126 extending generally along the length thereof. Adjacent opposite sides of slot 126 are a plurality of offset holes 128. A T-shaped handle 130 mounted on the distal end of a gauge wheel adjusting rod 132 (FIG. 7) has downwardly extending pins 134 (also FIG. 7) engageable with holes 128 on opposite sides of slot 126 for positioning T-handle 130 and associated adjusting rod 132 in a number of positions with respect to quadrant 124. This is for adjusting furrow depth, as will be explained. Further with regard to the closing means, first and second press wheel 56 and 58 are resiliently biased in the downward direction by spring members 136 and 138, respectively, which spring members are also adjustable as will be explained. Additionally, first press wheel arm 114 on which first press wheel 56 is pivotable or otherwise mounted is movable somewhat about spindle 116 in the transverse direction to enable the press wheel to follow the center of a furrow during sideward movements such as gradual turning of the unit 10 in the field. Second press wheel 58 is mounted for rotation on the short shaft (not shown) which is retained in a bore in transverse arm 118 by engagement with bolt 140 threadedly mounted on arm 118. The transverse position of second press wheel 58 can optionally be made adjustable by making bolt 140 engageable with the short shaft at more than one location along its length to enable moving wheel 58 inwardly and outwardly telescopically with respect to arm 118. A grass shield 142 is mounted using screw 144 on lower arm 38 in covering relation to the forward end portion of opener assembly 24 to prevent trash and other material from getting jammed and tangled with the respective components thereof.

Referring to FIG. 7, first press wheel spindle 112 is secured to press wheel arm 114 by passage through an aperture therethrough and threaded engagement with a nut 146. Spindle 116 is similarly secured in the central aperture of a bushing 148 by nut 150. Bushing 148 is mounted on a mounting plate member 152 which is secured to the rearward end of lower arm 38 with bolts 154. Spring 136 is a coil spring which wraps around the outer surface of bushing 148 and has one end that acts against the distal end of arm 114 and another end that acts against plate 152 to exert down pressure against press wheel 56 when in the field position. Similarly, spindle bolt 122 for the second press wheel passes through a central aperture in bushing 156 mounted on plate 152 and is secured in position by threaded engagement with nut 158. Spring 138 is a coil spring which wraps around bushing 156 and includes an elongated end portion selectably engageable with slot detent members 160–164 located adjacent the distal end of arm 120 for applying different degrees of down pressure against second press wheel 58. Spring 138 can also be left disengaged from all of the detent members to provide a no down pressure setting. The position of detent members 160–164 at a rearward location adjacent the end of the arm 120 provides ease of adjustablity without tools.

Gauge wheel 52 is mounted for rotation on a spindle 166 mounted on the distal end of a pivotable arm 168. Arm 168, in turn, is mounted for pivotal movement about a central shaft 170 mounted in an aperture extending through the rearward end of lower arm 38. A second arm 172 is attached to arm 168 for joint pivotal movement therewith about central shaft 170. Second arm 172 includes a distal end portion which is movable in slot 126 between the adjacent end of quadrant 124 and T-handle 130. When in the field position with the outer perimeter of gauge wheel 52 shown in phantom lines resting on the ground surface 174, arm 168 and arm 172 will be jointly pivoted in the clockwise direction to a position wherein arm 172 is in engagement with T-handle 130 thereby setting the maximum depth of penetration of disk 50 also shown in phantom lines, into the ground, which depth will also be the furrow depth and is designated by the letter X. Furrow depth is easy to adjust using T-handle 130 and requires no tools. T-handle 130 is biased by an internal spring member (not shown) toward quadrant 124 and when no down pressure acts against the gauge wheel, arm 172 will be resting against the end of slot 126 so that the T-handle can be manually lifted and rotated about central shaft 170 to engage pins 134 with any selected slots 128 on the quadrant for changing the furrow depth X. Typically, for most applications the furrow depth X will be within a range from about ½ to about 4 inches, and using the means shown can be adjusted in ¼ inch or less increments.

Figure 8:
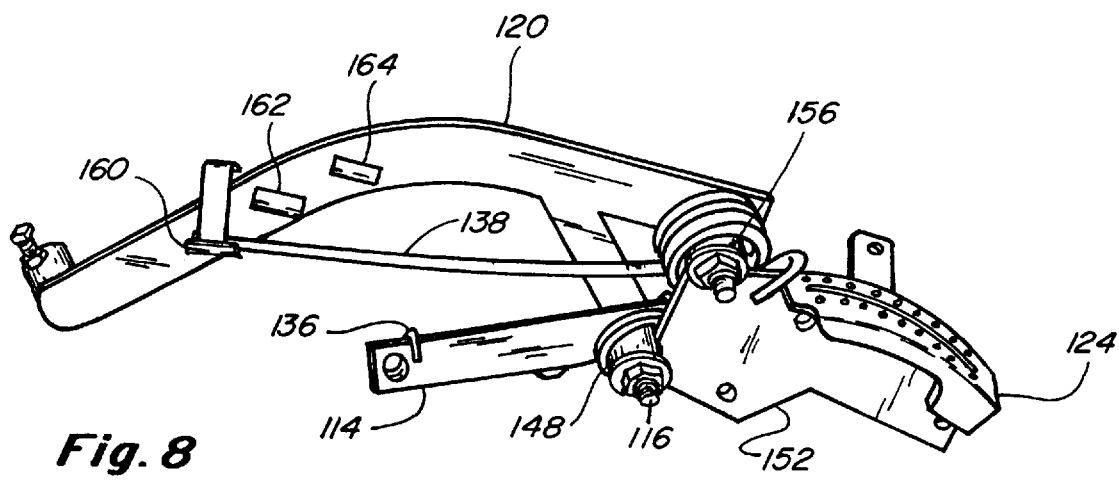
FIG. 8 is an enlarged perspective view of the mounting plate assembly of the unit of FIG. 6 showing the press wheel mounting arms and related spring members in position thereon.

FIG. 8 shows mounting plate 152 detached from arm 38. Mounting the press wheel arm members 114 and 116, spring members 136 and 138, and press wheels 56 and 58 (not shown) on a detachable mounting plate member as shown provides ease of assembly and disassembly and interchangeability of components in the field for shorter downtimes for service and the like.

Figure 9:
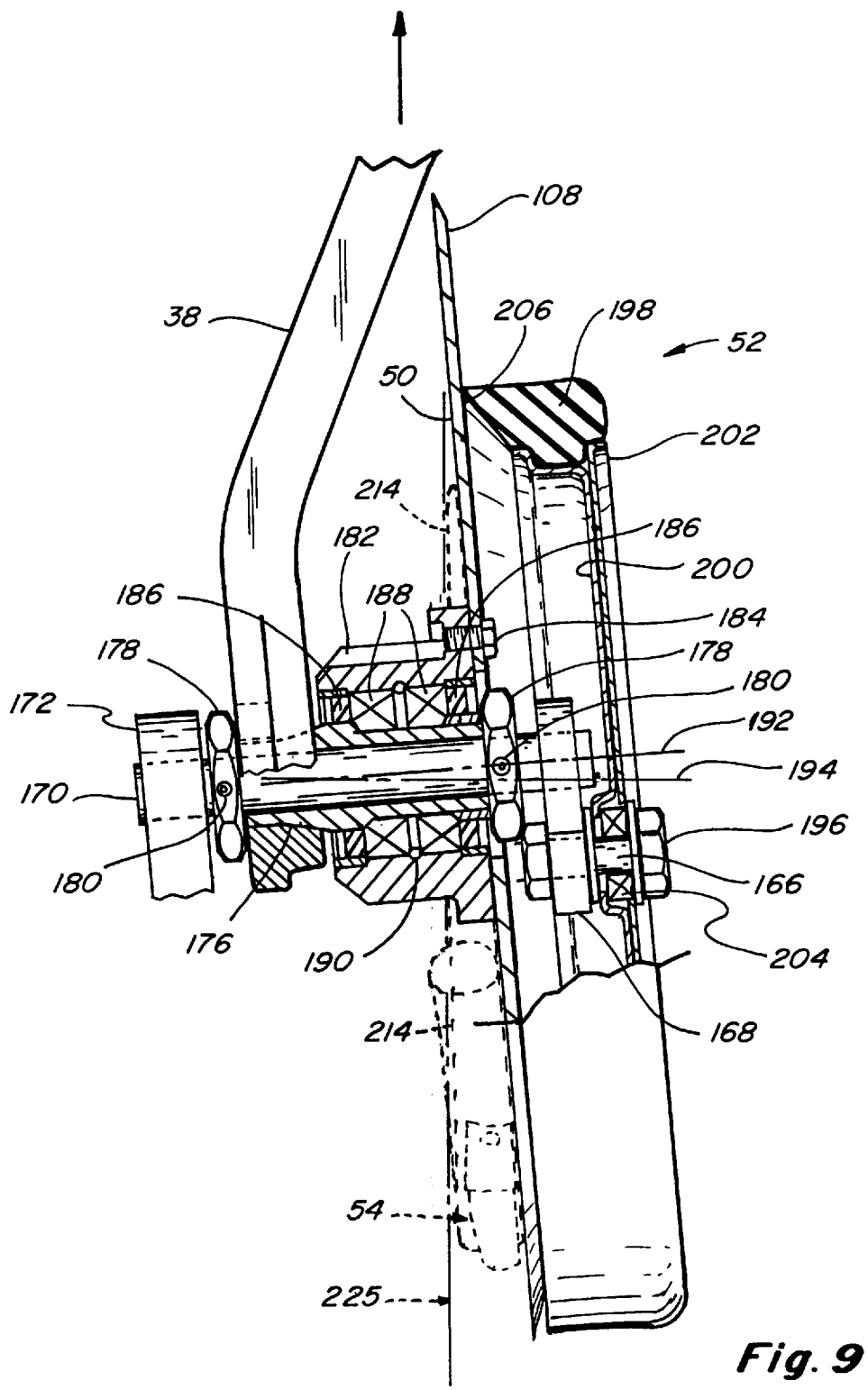
FIG. 9 is a partial sectional view of the planting unit of FIG. 1 taken along lines 9—9.

Referring to FIG. 9 which shows the right hand opener 24 of FIG. 1, the disk 50 is shown rotatably mounted to the rearward end of arm 38 on a hollow spindle 176. The tapered end of hollow spindle 176 is received through an opening on the arm and is secured thereto by a first nut 178 and set screw 180. The disk 50 is attached to bearing housing 182 by bolts 184. The bearing housing 182 rotates with respect to spindle 176, and the bearing housing 182 is secured in its horizontal position with respect to the spindle 176 by a second nut 178 and a second set screw 180. The bearing housing 182 encloses and protects a pair of seals 186 and bearings 188 which are held in position by an annular lip or snap ring 190. With reference to the discussion above relating to the angular orientation of disk 50, the hollow spindle 176 has an axis 192 that is disposed at the above described 4° to 6° angle with respect to a transverse reference line 194. Since the disk 50 is disposed perpendicular to spindle 176, it will be disposed at a similar angle with respect to the direction of travel.

FIG. 9 also shows the gauge wheel 52 in greater detail. As discussed above, gauge wheel 52 is mounted for rotation on spindle 166 which is mounted adjacent the distal end of arm 168 attached to one end of central shaft 170. As shown here, shaft 170 passes through hollow spindle 176 and an aperture through lower arm 38. Gauge wheel 52 includes a flexible tire 198 mounted on an inner and outer wheels 200 and 202, which inner and outer wheels are mounted on a sealed bearing 204 rotatable on spindle 166. Tire 198 of gauge wheel 52 has an inner edge or blade portion 206 that engages front face 108 of disk 50 for wiping or scraping the disk face during rotation of the respective members.

Figure 10:
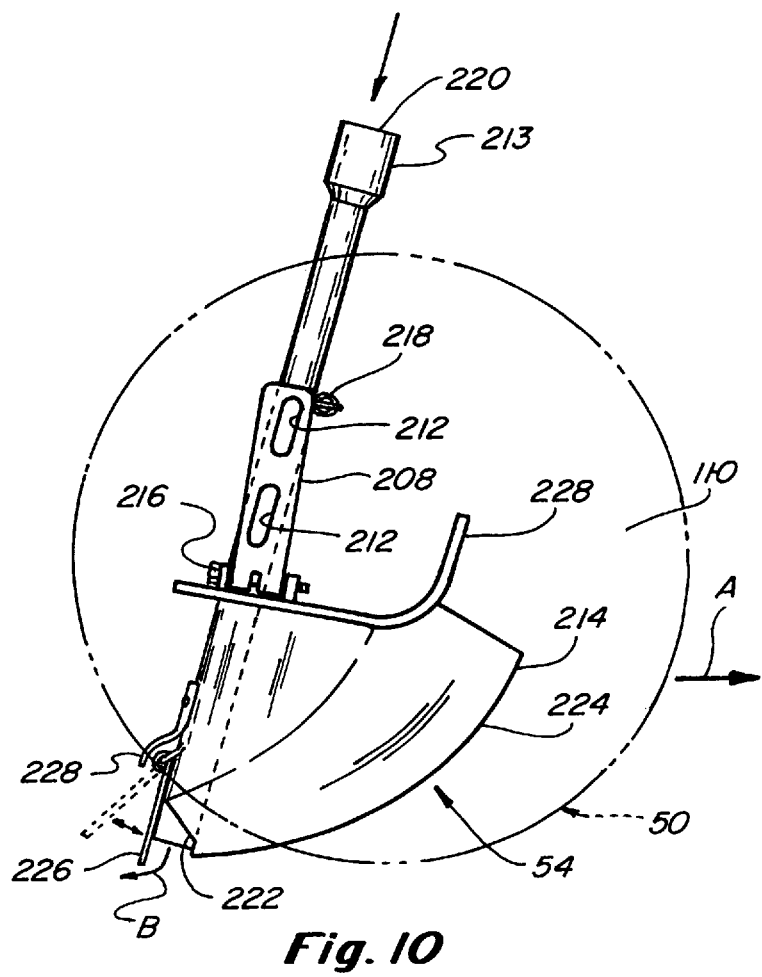
FIG. 10 is an enlarged side elevational view of the seed tube assembly of the unit of FIG. 6, showing the disk member of the unit in phantom lines.

Referring to FIGS. 10 and 11, the seed tube assembly 54 is shown in greater detail. Seed tube assembly 54 includes a mounting arm 208 which is adjustably clamped adjacent the disk side of the rearward portion of arm 38 by retaining plate 210. Retaining plate 210 is threadedly engaged with bolts 154 which pass through holes in arm 38 and through elongated slots 212 in the mounting arm. Seed tube assembly 54 further includes a hollow or tubular seed tube 213 and a runner or shoe 214 pivotally attached to mounting arm 208 by bolt 216. The lower end portion of seed tube 213 as well as runner or shoe 214 are biased against rearward face 110 of disk 50 by a spring 218 which is preferably a coil spring attached between the upper end of mounting arm 208 and an upper portion of the seed tube 213, although other types of springs could also be used. The upper end of seed tube 213 attaches to the bottom end of hose 22 using a hose clamp or other suitable means (FIG. 1) and includes a seed tube inlet opening 220 for receiving seed from the hose. Seed tube 213 provides a straight, un-obstructed conduit of passage for seed therethrough, the seed exiting form the tube through an outlet opening 222, as shown by the arrow B. The outlet opening 222 is angularly oriented with respect to the longitudinal axis of the tube 213 so as to open both downwardly and rearwardly with respect to the forward direction identified by the letter A in FIG. 10. Runner 214 is located forwardly of the seed tube lower portion and includes a downwardly and rearwardly curving blade-like leading edge portion 224 which is positioned in close relation to rearward surface 110 of disk 50. Runner 214 serves to hold and prevent loose top soil adjacent that side of the furrow from falling into the furrow in advance of seed deposited therein, but is sufficiently narrow so as to move through the furrow behind or in the shadow of that portion of the disk engaged with the soil so as to no further significantly form, firm or otherwise enlarge the furrow or disturb the adjacent soil. That is, the shadow of the disk is defined by the profile of the disk when viewed from the rear, and the runner 214 as well as the lower portion of the seed tube 213 and other lower seed tube components are located in this shadow or profile when also viewed from the rear. In this regard, FIG. 9 shows seed tube 54 and runner 214 in phantom, no portion of the lower portion of which extends outwardly of the profile or shadow of that portion of disk 50 which will be engaged with the ground, represented by rearwardly projecting line 225.

The downwardly and rearwardly curving leading edge 224 of runner 214 is another important feature. Most importantly, the downwardly and rearwardly curving blade-like edge enables the runner to have a tapered profile shape which gets narrower towards the bottom end terminating at the blade-like edge. This enables the runner to be more easily conformed to the profile shape of the disk 50 to thereby avoid any significant contact with a furrow wall formed thereby, which furrow wall will have a shape generally corresponding to the profile shape of the disk leading edge. Because the runner does not significantly engage the furrow wall, it can be of relatively lightweight construction, such as from sheet metal, nylon and other polymers and other materials. The downwardly and rearwardly curving shaped also enables maintaining at least most of the runner out of contact with the bottom of the furrow, such that the runner places no significant drag on the assembly as it moves through the furrow and will not be inclined to collect mud under wet conditions. The above described runner shape has also been found to eliminate the need for any rearward extension or runner aft of the seed tube outlet, which again reduces drag, and also side draft forces when turning.

Still another important feature of the present invention is means to prevent soil from backing up into and clogging the seed tube outlet 222 mounted just rearwardly thereof. The anti-clogging means include a flap member 226 which as shown in FIG. 11 generally conforms to the profile shape of seed tube outlet opening 222 so as not to drag through the furrow. The flap member is pivotally mounted on the seed tube with adjustable hinge 228. With the opener in the field position and moving forwardly as designated by the arrow A in FIG. 10, flap 226 will be oriented in an open position about like that shown in hidden lines, so as not to obstruct or otherwise hinder the outflow of seed from seed tube outlet 222. In the event the opener is moved in the rearward direction, flap 226 will position itself about as shown in solid lines to prevent the passage of soil and other matter into outlet opening 222. As mentioned previously, seed tube assembly 54 is adjustably positionable with respect to lower arm 38 by loosening bolts 154 and repositioning the seed tube assembly in a more upward or downward position, as desired. This feature is useful for fine tuning seed placement in the furrow, and also for adjusting seed tube position as the disk wears. As also noted above, the seed tube and runner portion of assembly 54 is pivotable relative to mounting bracket 210 and the lower end is resiliently urged against rear disk face 110 by spring 218. This enables runner 214 to scrape and clean disk face 110 as it rotates through the soil, and allows the seed tube assembly to be resiliently urged away from disk 110 to enable the passage of trash and other matter between the seed tube assembly and disk. Also carried on arm 38 is another shield 228 that prevents trash and other matter from jamming and preventing pivotal movement of the seed tube assembly.

Referring to FIGS. 12 and 13, second press wheel 58 is mounted for rotation on arm 118 for pushing or otherwise moving soil into covering relation seed located in the furrow. For optimal performance, as mentioned above the transverse position of second press wheel 58 can be made adjustable by loosening adjusting bolt 140 and sliding the spindle on which the wheel is mounted (not shown) longitudinally to a desired position in tubular arm 118 and retightening adjusting bolt 140. Additionally, transverse arm 118 can be adjustably positioned with respect to longitudinal arm 120 with adjusting bolt 230, by loosening of adjusting bolt 230 and rotating arm 118 thereby orienting closing wheel 58 at a number of different angular orientations with respect to ground 44. This is to enable adjusting the wheel to provide a relatively precise amount of coverage for the seed. In this regard, incremental markings such as shown at 231 can be provided on arms 118 and 120 for referencing the rotational position of arm 118 with respect to arm 120 and to enable more easily adjusting the arms of a number of opener assemblies to the same setting. The construction and shape of second press wheel 58 is also important. Second press wheel 58 is preferably made from a lightweight material such as aluminum and has an outer rim portion 232. Outer rim portion 232 can be integrally formed, or can be a replaceable member made from steel or other longer lasting material. Outer rim portion 232, importantly, has a double beveled shape formed by angularly related surfaces 234 and 236. The double beveled shape of edge 232 enables surface 234, which is the leading surface as the wheel moves across the ground, to engage the ground and push a desired amount of soil into the furrow. Surface 236 is the trailing surface and its angular relationship to leading surface 234 enables it to be positioned in generally parallel relation to the surface of the ground. This is important as it makes the press wheel less likely to displace a long ribbon or strip of soil in wet conditions, and less likely to plow in softer, dryer soils.

Figure 14:
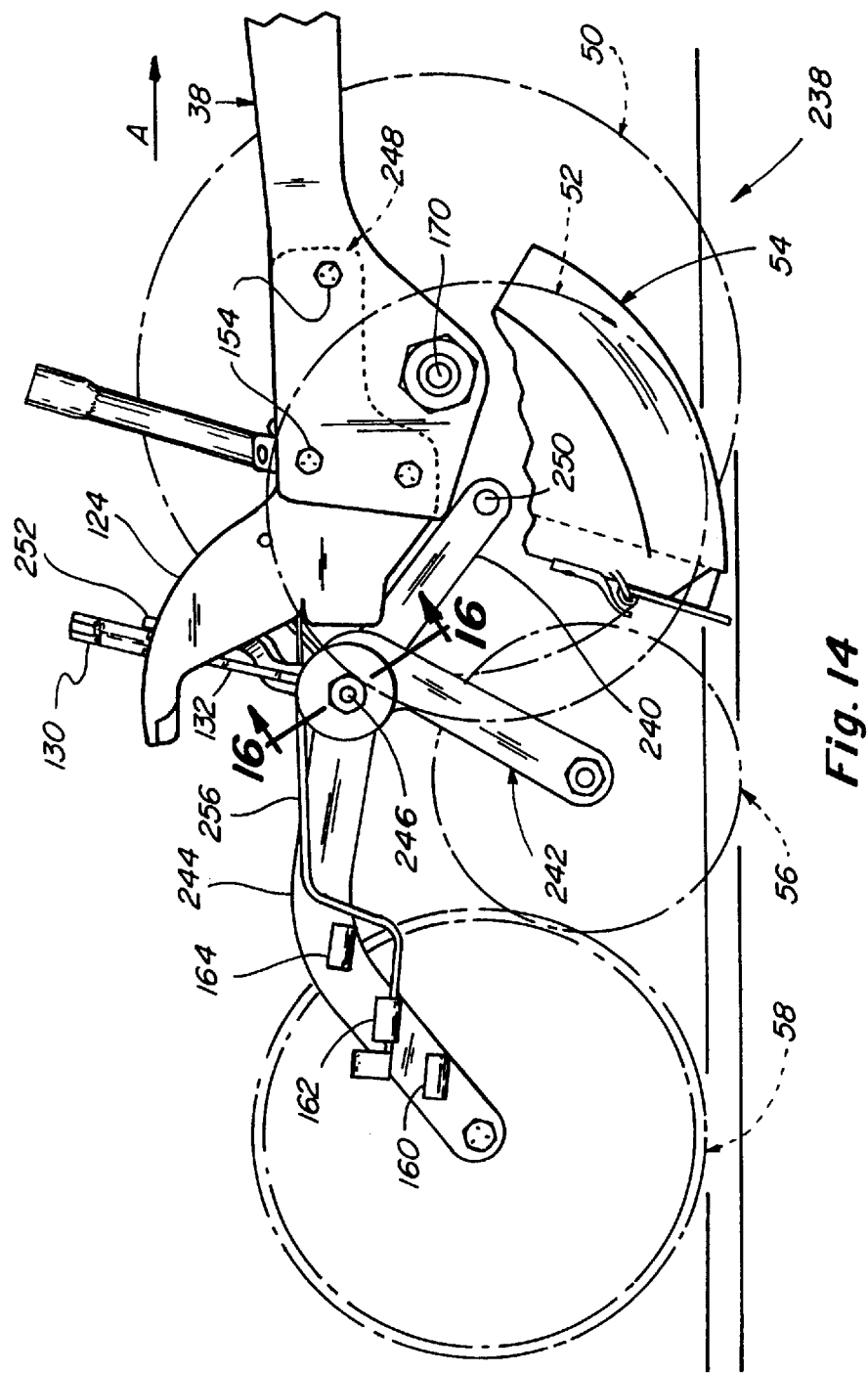
FIG. 14 is an enlarged fragmentary side elevational view of a second embodiment of a planting unit according to the present invention including the gauge wheel and press wheel assemblies mounted on a single pivotal axis.

FIG. 14 shows another embodiment of an opener assembly 238 having generally the same component parts and functioning generally in the same manner as opener assembly 24 discussed above. Like components of opener assembly 238 corresponding to those of opener assembly 24 are designated by the same reference numbers. Opener assembly 238 primarily differs from opener assembly 24 in the provision of gauge wheel pivot arm 240, and first and second press wheel support arms 242 and 244, which are all mounted for pivotal movement about the axis of a single spindle or bolt 246 mounted to a mounting plate 248. Mounting plate 248 is mountable on the rearward portion of lower arm 38 in the same manner as described above. Gauge wheel 52 is mounted for rotation on a spindle 250 located adjacent the distal end of arm 240. Mounted for joint pivotal movement with gauge wheel mounting arm 240 is a gauge wheel adjusting arm 252 which has a distal end portion positioned in slot 126 of quadrant 124 and movable between the end of the slot and T-handle 130 in the manner described above with respect to arm 172. Further, the press wheel mounting arms 242 and 244 are pivotable in generally in the same manner as described above with respect to arms 114 and 120, and include a first spring member 254 (FIG. 15) for resiliently biasing first press wheel arm 242 in the downward direction, and a second spring member 256 for resiliently biasing second press wheel mounting arm 244 in the downward direction. Spring member 256, like spring member 138, includes an elongated portion selectively engageable with slot or detent members 160–164 on arm 244 for adjusting the spring force exerted thereagainst.

Figure 15:
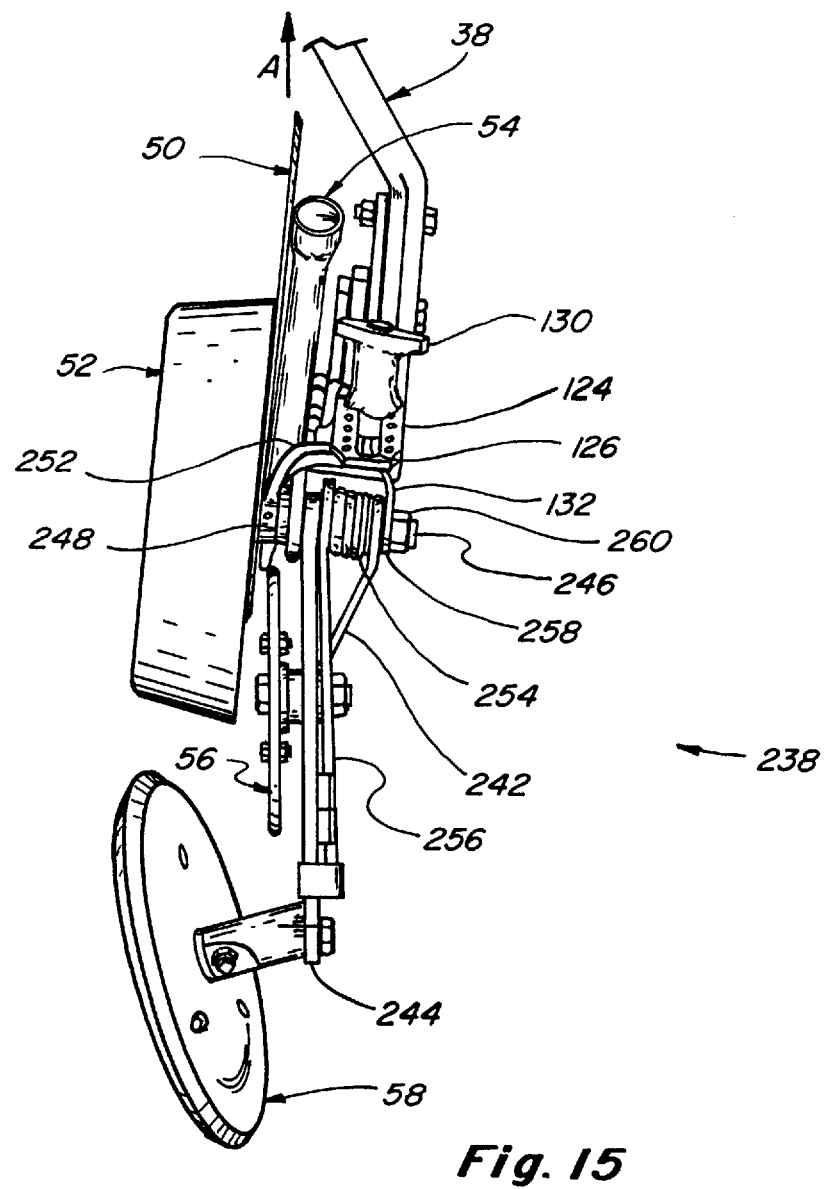
FIG. 15 is a top view of the planting unit of FIG. 14.

FIG. 15 is another view of the opener arm assembly 238 showing the location and orientation of the respective components thereof, as well as their mounting positions with respect to opener arm 38. Gauge wheel support arm 240 (FIGS. 14 and 16) and adjusting arm 252 are jointly mounted on the end of spindle 246 located adjacent gauge wheel 52. The spindle 246 extends from the arms 240 and 252 through an opening in mounting plate 248 and past the plate a predetermined distance. The press wheel mounting arms 242 and 244, as well as springs 254 and 256, and T-handle adjusting rod 132, are mounted on the side of spindle 246 opposite the gauge wheel. The above named members are retained on spindle 246, and spindle 246 is maintained in position on mounting plate 248, by washer 258 and nut 260. The position and orientation of disk 50 as well as gauge wheel 52 at an offset angle with respect to the forward direction indicated by the arrow A is shown, as is the relative positions of first and second press wheels 56 and 58.

Figure 16:
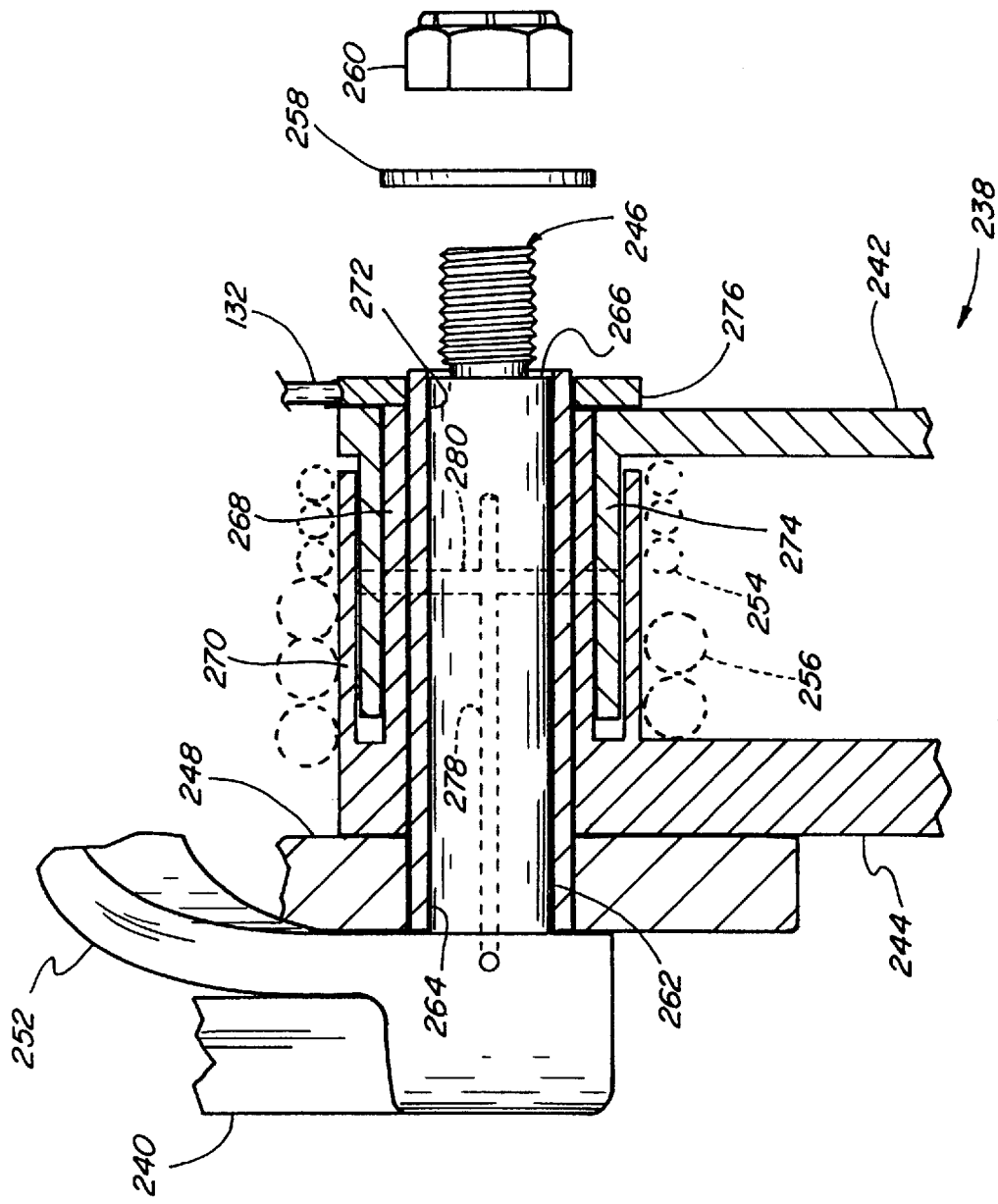
FIG. 16 is a fragmentary cross-sectional view taken along lines 16—16 of FIG. 15.

FIG. 16 shows the internal arrangement and order of assembly of the components of opener arm assembly 238. Gauge wheel mounting arm 240 and adjusting arm 252 are shown as integrally formed on one end of spindle 246. Spindle 246 further includes an elongated cylindrical portion 262 of predetermined length which extends from the juncture with arms 240 and 252 through the central bore of bushing 264. The cylindrical portion 262 terminates at an annular shoulder 266 adjacent a threaded end portion which receives washer 258 and nut 260. Bushing 264 is mounted in an opening extending through mounting plate 248 and serves as a bearing for the spindle 246. Bushing 264 is slightly longer that the cylindrical portion 262 of spindle 246 such that washer 258 bears against the bushing when nut 260 is tightened. Press wheel arm 244 includes an inner cylindrical portion 268 which mounts in overlaying relation to bushing 264, and an outer cylindrical portion 270 spacedly related to inner portion 268. The outer surface of bushing 264 serves as a bearing surface for the cylindrical portion 268, and the outer surface of inner cylindrical portion 268 serves as a bearing surface for a cylindrical mounting portion 274 of press wheel arm 242, which cylindrical portion 274 is sized for locating in the annular shaped cavity defined between inner and outer cylindrical portion 268 and 270 of the member 244. T-handle adjusting rod 132 includes an annular shaped mounting portion which also mounts on the outer surface of bushing 264, and importantly is retained in position thereon by washer 258 and nut 260. In this regard, it should be noted that washer 258 abuts the end of bushing 264 so as to provide some end play for the members mounted thereon. This is important as it provides retention of all of the members on spindle 246, without interfering with the free pivotal movement thereof. It can also be seen from this arrangement, that gauge wheel mounting arm 240 and adjusting arm 252 can be pivotable independent of press wheel arms 242 and 244, while sharing a pivotal axis therewith. To facilitate free movement of the respective pivotal members, a grease fitting (not shown) can be mounted in communication with passageway 278 which extends partially through spindle 246 and communicates with cross passages 280 extending through the various members for providing grease to the various bearing surfaces. To further facilitate a compact and easy to service assembly, springs 254 and 256 are preferably coil spring members which wrap around the outer surface of press wheel mounting arm 244. It can be seen from this figure that the removal of the single nut 260 enables easy disassembly of the gauge wheel, springs and press wheel mounting arms, in a matter of moments. Additionally, like several members of the assembly 24 mounted on mounting plate 152, the components of opener assembly 238 mounted on mounting plate 248 are easily detachable from arm 38 as a unit by removing mounting bolts 154. Referring again to FIG. 14, note that quadrant 124 and T-handle 130 are located adjacent the rearward portion of opener assembly 238 aft of seed tube assembly 54. This location makes adjustment of planting depth easier from the rear of the unit compared to the location on opener assembly 24 shown in FIG. 7. Still referencing FIGS. 14 and 7, it can be noted that the distance between gauge wheel center 250 and disk center 170 of assembly 238 (FIG. 14) is shorter than the distance between gauge wheel center 166 and disk center 170 of assembly 24 (FIG. 7). An advantage of a small distance between the gauge wheel axis and disk axis is that as the opener assembly pivots with arm 38 about flange bolt 42, there will be even less variation in planting depth, although the low pivot point of arm 38 already acts to greatly minimize this problem, as explained elsewhere herein. It should be further noted with regard to opener assembly 238 that gauge wheel adjusting arm 240, first press wheel mounting arm 242, and second press wheel mounting arm 244 need not all be mounted for pivotal movement about the same axis. In this regard, it is recognized that any one of the respective members could be mounted for pivotal movement about a separate axis, although this is not a preferred embodiment.

In operation, when implement 10 is towed in the forward direction indicated by the arrow A and rockshaft 26 is rotated counterclockwise to engage either opener assembly 24 or opener assembly 238 with the soil 44, as shown in FIG. 1, disk 50 will open a relatively narrow furrow in the soil. Gauge wheel 52 will establish the penetration depth of disk 50 into the soil, and thus the furrow depth, and seed tube assembly 54 will move through the furrow in the shadow of disk 50 depositing seed in the bottom of the furrow at a rate controlled by metering means 20 and the pulling speed. First press wheel 56, which is preferably a relatively narrow member sufficiently small to follow along in the bottom of the furrow, is biased downwardly so as to firmly press the seed into the bottom of the furrow. Second press wheel 58 trails first press wheel 56 adjacent one side of the furrow, and its double beveled shaped and angle enable it to precisely scrape or move a desired amount of soil into covering position over the seed. Importantly, the adjustability of the second closing wheel 58 in terms of both position, orientation and downward biasing pressure, enables the precise placement of soil over the seed in both loose soil and wet conditions. Further, the light weight of the second press wheel enables it to maintain relatively consistent contact with the soil, even at high pulling speeds. As mentioned above, the lower portion of seed tube assembly 54 is positioned and sufficiently narrow so as to follow in the shadow or profile in disk 50 without significantly forming or firming the side of the furrow and acts only to keep loose soil out of the furrow long enough for seed to be deposited in the bottom of the furrow. Another important operational feature of the present invention is the opener arm assembly 28. The relatively low pivot point of lower arm 38 is important as it enables lower arm 38 to be oriented when in the field position at a relatively small angle with respect to horizontal in a arrange from about 0° to about 20°, and preferably in a range less than 15° or so. This enables the opener assembly 24 to maintain a relatively constant orientation and relationship with respect to the soil as lower arm 38 is pivotally displaced, enabling the opener to pass over surface irregularities and the like without significantly affecting furrow depth and seed placement. Also importantly, this arm assembly geometry enables rockshaft 26 to be rotated in the counterclockwise direction to position upper arm 30 in even a substantially vertical or forwardly directed orientation without significantly affecting the orientation of lower arm 38 and opener assembly 24. This is a particularly important feature of the present invention. Also notable, the freedom of movement of spring guide rod 84 relative to upper spring bracket assembly 48 enables a relatively wide range of pivotal movement of lower arm 38 without rod 84 extending below the pivot point 42, which is a desirable feature when traversing fields containing standing trash as the rod is not likely to contact the trash. Still another feature of the present invention is the relatively small offset angle of disk 50, preferably about 5° or less, which forms a narrower furrow than other known planting units and enables gauge wheel 52 to be relatively narrow such that the overall width of the unit can be correspondingly small and a greater number of planting units can be mounted on a rockshaft of a given length, enabling planting in closer rows. The small disk offset angle in combination with the narrowness of the lower portion of the seed tube assembly causes less drag when pulled through the soil. This results in less wear and enables the respective components to be of lighter construction, all of which features enable an implement utilizing planting units construction according to the present invention to be pulled with a smaller tractor. Additionally, the lighter weight and shorter height capabilities of the present planing unit can be combined to provide an implement that has less of a tendency to "walk" at higher pulling speeds.

Figure 17:
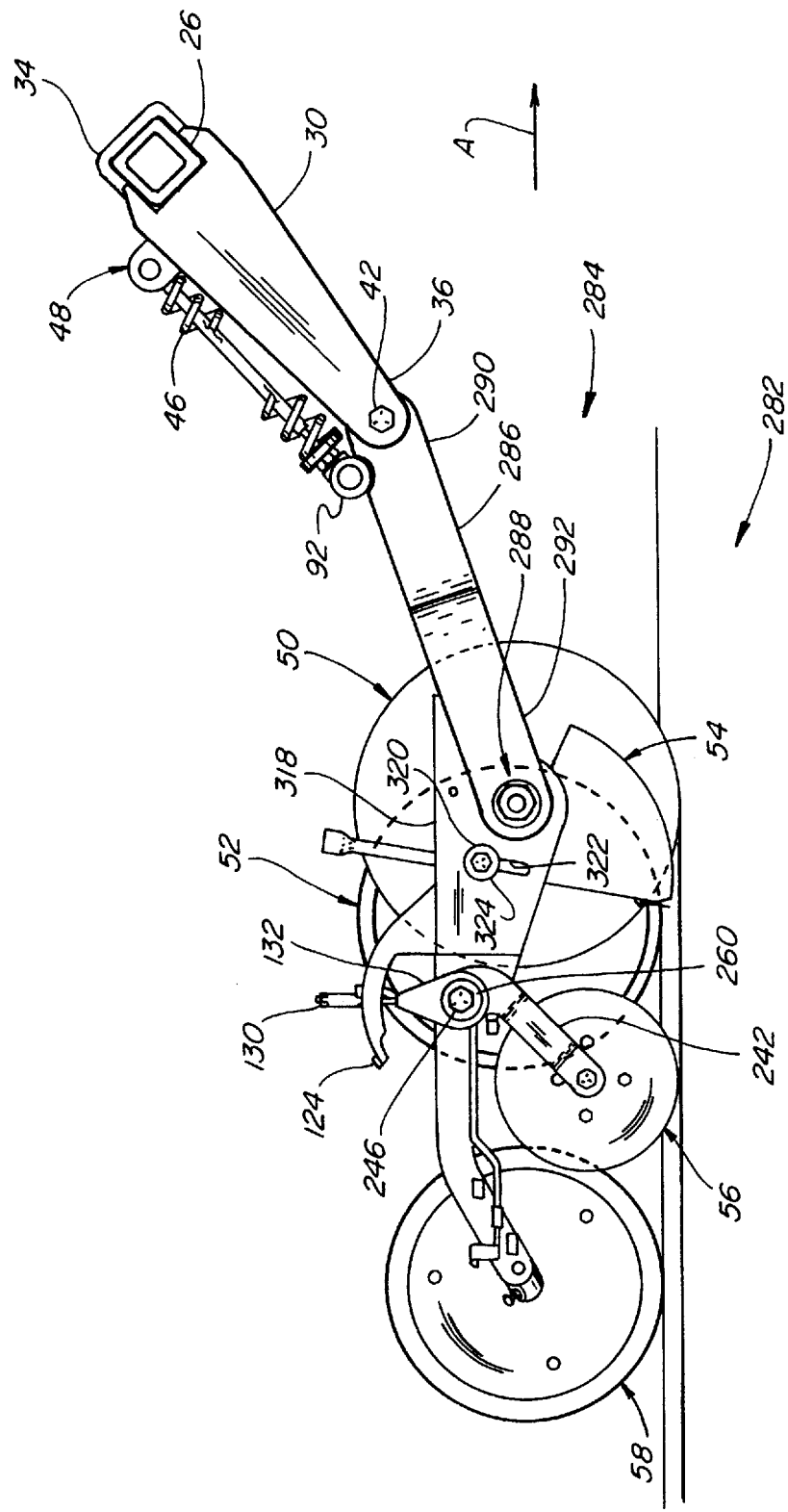
FIG. 17 is a side elevation view of a third embodiment of a planting unit according to the present invention.
Figure 18:
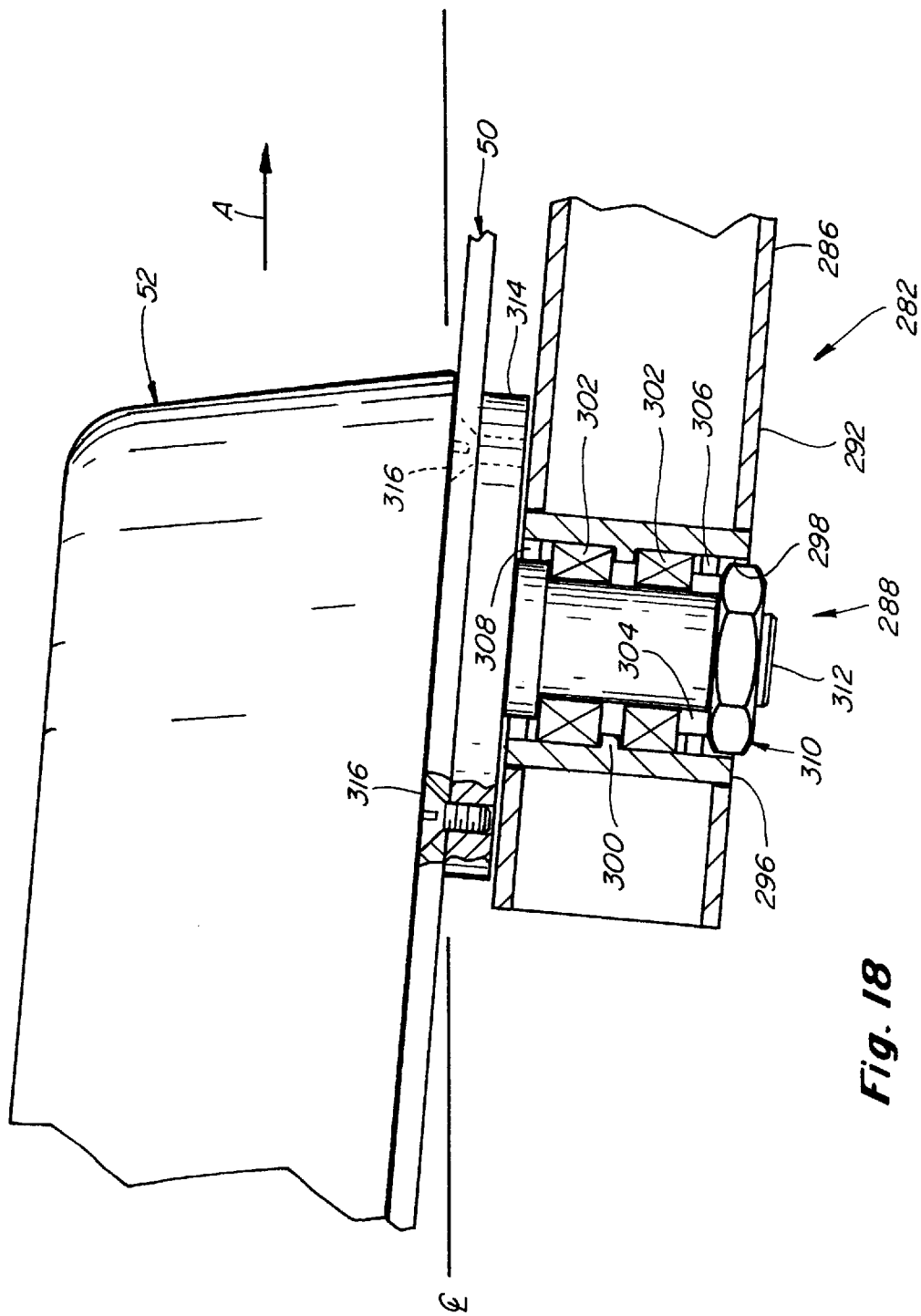
FIG. 18 is a fragmentary partial cross-sectional view of the planting unit of FIG. 17.

FIG. 17 shows still another embodiment of an opener assembly 282 having many of the same component parts and functioning in the same manner as opener assemblies 24 and 238, and, again, like components of opener assembly 282 corresponding to those of opener assembly 24 and opener assembly 238 are designated by the same reference numbers. Opener assembly 282 primarily differs from the previously discussed opener assemblies in the provision of a draw bar assembly 284 including a lower arm 286 which carries a disk bearing assembly 288 internally therein for rotatably supporting disk 50, as best shown in FIG. 18. Draw bar assembly 284 additionally includes an upper arm 30 fixedly attached to a rock shaft 26 using U-bolts 34 secured in position around the rock shaft 26 with nuts 60 (not shown) in the conventional manner, as described above. Rock shaft 26 forms part of an implement such as the seed drill 10 discussed above (not shown). Lower arm 286 has a forward end 290 pivotally connected to lower end 36 of upper arm 30 with pivot bolt 42 and is biasable in the downward direction by compression spring 46 mounted between an upper spring bracket assembly 48 mounted to upper arm 30 and a lower pivot pin 92 mounted to lower arm 286, all as previously described above.

Figure 19:
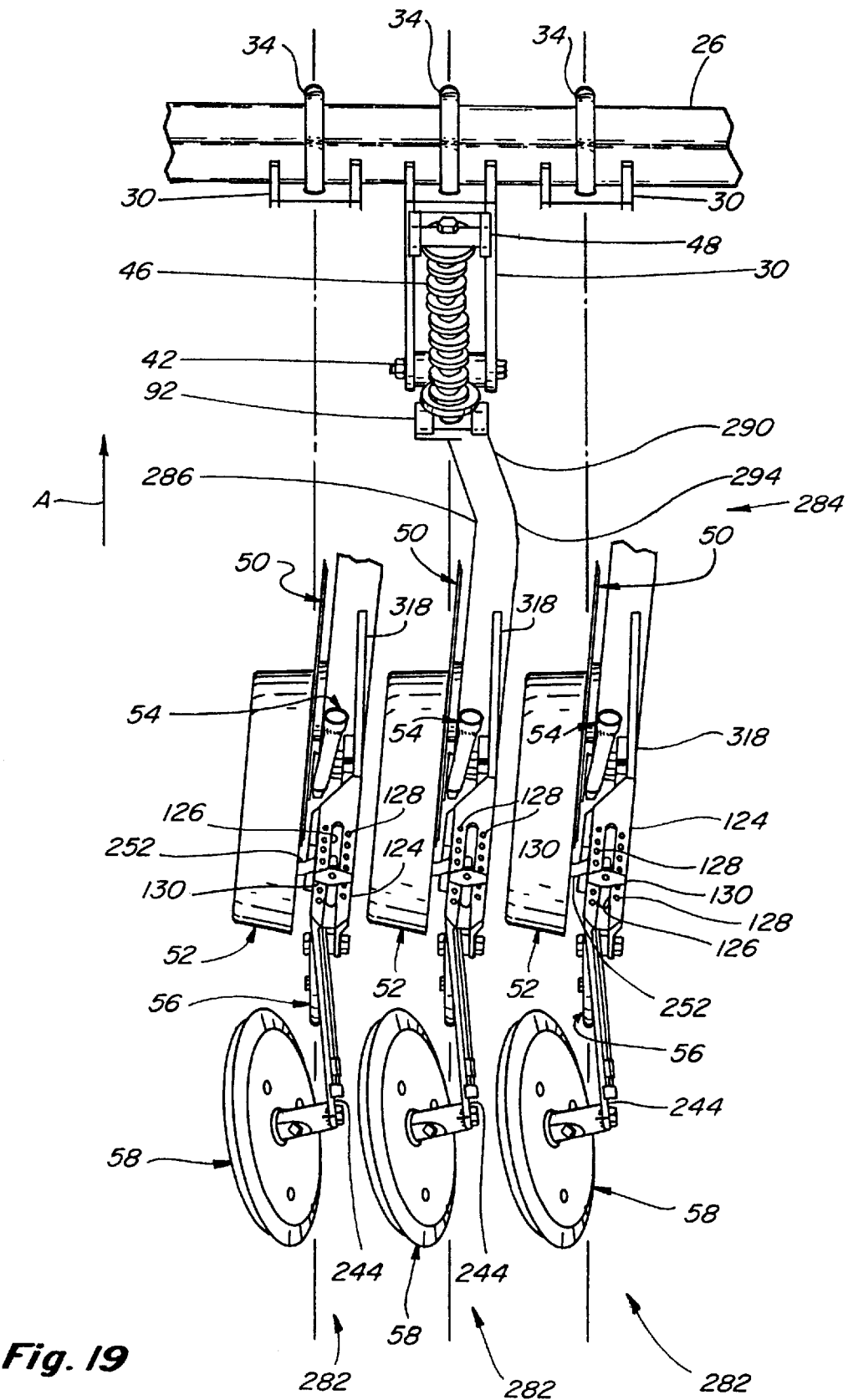
FIG. 19 is a top view showing a plurality of the planting units of FIG. 17.

Referring also to FIGS. 18 and 19, lower arm 286 is an elongated member of rigid, tubular construction and includes a rearward end 292 opposite forward end 290 and an intermediate portion 294 located therebetween, which intermediate portion 294 includes a bend which orients rearward end 292 at a small actuate angle with respect to the forward direction of travel of the implement on which the opener assembly 282 is mounted, which direction of travel is designated by the arrow identified by the letter A as before, and the preferred small actuate angle being generally about 5°, as best shown in FIG. 19. Importantly, referring more particularly to FIG. 18, rearward end 292 of lower arm 286 carries disk bearing assembly 288 in a transversely mounted cylindrical shaped tubular bearing housing 296, which serves to orient the plane of disk 50 at a corresponding small acute angle of about 5° to the direction of travel A. Bearing housing 296 includes an internal cylindrical cavity 298 extending therethrough adapted for receiving disk bearing assembly 288 and an annular flange 300 extending around cavity 298 for centering the disk bearing assembly in cavity 298. Disk bearing assembly 288 includes two bearings 302, an annular spacer 304, inner and outer dust seals 306 and 308, and nut 310, all of which mount on a cylindrical spindle 312, one end of which spindle is mounted to disk flange 314. Spindle 312 has a threaded end opposite disk flange 314 threadedly engaged by nut 310 which retains the spindle in the bearing housing as shown. Disk 50 is mounted to the surface of disk flange 314 opposite spindle 312 with flat head screws 316 which pass through countersunk holes in disk 50 as shown. This mounting arrangement including the use of countersunk flat head screws 316 is important as it enables the edge of the rubber or polymeric material tire portion of gauge wheel 52 to pass over screws 36 without catching or tearing on the screws to provide an increased range of adjustability for the gauge wheel. Carrying bearing assembly 288 internally in rearward end 292 of lower arm 286 is also important by itself as it enables the overall width of opener assembly 282 to be reduced by an amount equal to the about one half the width of the bearing assembly as compared to the above discussed opener assemblies 24 and 238 both of which locate the bearing assembly for the disk between the disk and the lower arm. This in turn facilitates the location of a plurality of the openers 282 in closely spaced, side-by-side relation, as illustrated in FIG. 19, which enables planting in more closely spaced rows, for instance, 6 or 7 inches apart or less.

Additional features of opener assembly 282 that facilitate the mounting and operation of adjacent opener assemblies in more closely spaced, side-by-side relation include the provision of a quadrant 124 mounted over the rearward end of a mounting plate 318 attached to the rearward end of lower arm 286. Quadrant 124 includes the same components as discussed above including an elongated slot 126 with offset holes 128 on either side, along with a downwardly biased T-shaped handle 130 having pins 134 (not shown) selectively engageable with holes 128 for limiting the travel of the distal end of a gauge wheel adjusting arm 252 located in slot 126 to enable adjusting the planting depth of the opener as previously explained. T-shaped handle 130 is mounted on an adjusting rod 132 mounted for rotation about a rear spindle 246 mounted adjacent the rearward end of mounting plate 318 below quadrant 124. Similarly, as previously described above with reference to FIGS. 14–16, first and second press wheels 56 and 58 are mounted for rotation on press wheel arms 242 and 244, respectively, which are also mounted along with springs 254 and 256 on spindle 246 and held in position with nut 260.

Like the previous embodiments 24 and 238, opener assembly 282 additionally includes a seed tube assembly 54 which can be adjustably mounted to the opener assembly in the above described manner, or mounted as shown in FIG. 17, using a single bolt 320 which passes through a slot 322 through plate 318 and is threadedly engageable with a threaded aperture (not shown) on the seed tube assembly 54 to bear against a washer 324 and frictionally hold the seed tube assembly in a desired vertical position.

Figure 20:
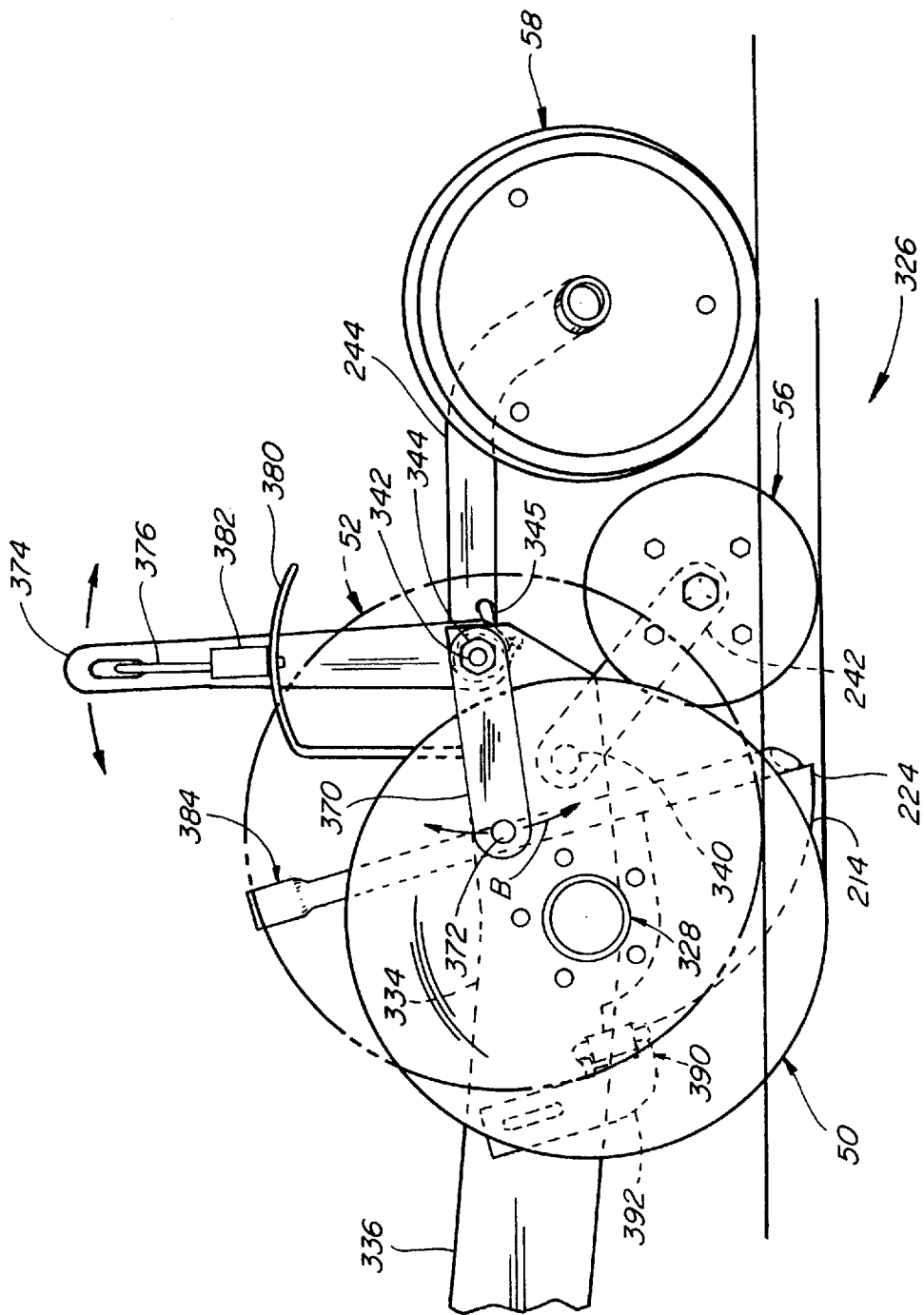
FIG. 20 is a side view of still another embodiment of a planting unit according to the present invention.
Figure 21:
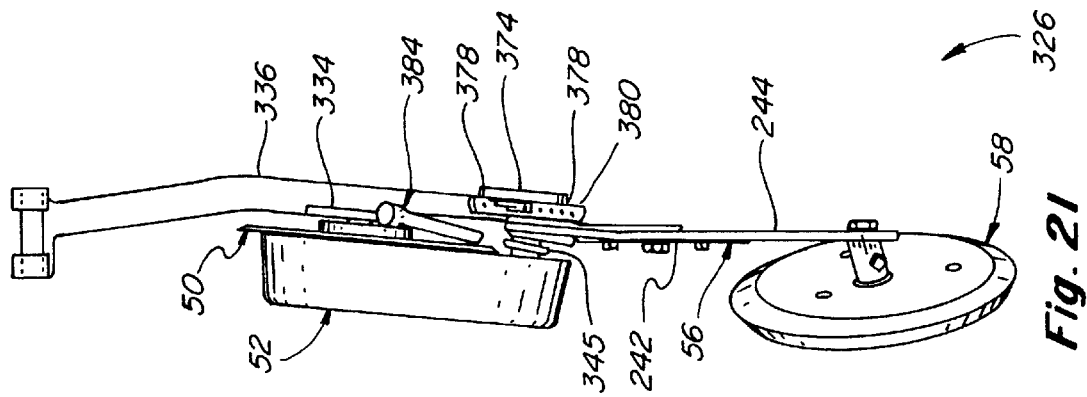
FIG. 21 is a top view of the planting unit of FIG. 20.
Figure 22:
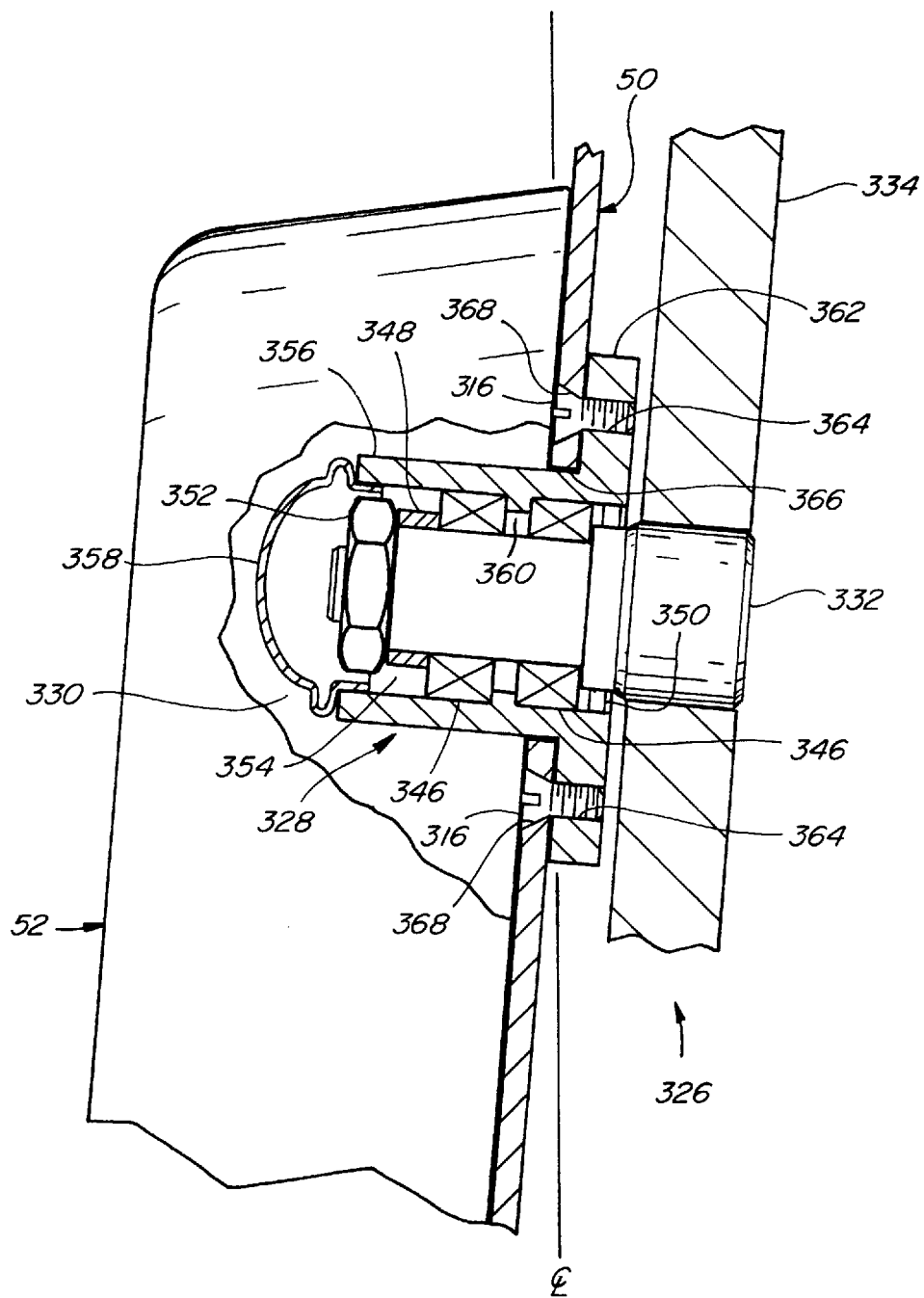
FIG. 22 is a fragmentary, partial cross-sectional view of the planting unit of FIG. 20.

FIGS. 20, 21 and 22 are a left hand side view, a top view and a partial cross-sectional view, respectively, of still another embodiment of an opener assembly 326 having many of the same component parts and functioning in the same manner as opener assemblies 24, 238 and 282, again, like components of opener assembly 326 corresponding to those of the previously described opener assemblies being designated by the same reference numbers. Opener assembly 326 primarily differs from the previously discussed opener assemblies in the provision of a disk bearing assembly 328 for rotatably supporting disk 50 located in a cavity 330 of gauge wheel 52 to reduce the overall width of the opener, and in the provision of an alternative seed tube assembly and an alternative quadrant assembly for adjusting planting depth. The construction of gauge wheel 52 is discussed above and is shown in FIG. 9. Disk bearing assembly 328 is mounted on a spindle 332 (FIG. 22) which is fixedly mounted so as to project transversely from a mounting plate 334 mounted to the rearward end of a lower drag arm 336 (FIG. 21). Lower drag arm 336 mounts for pivotal movement to an upper arm of a drag arm assembly (not shown) and is biasable downwardly in the conventional manner as described above by a spring member (also not shown) and like the previously described lower drag arms, drag arm 336 is bent at about a 5° angle to the direction of travel of an implement on which the opener assembly is mounted. Opener assembly 326 likewise includes first and second press wheels 56 and 58 mounted for rotation on press wheel arms 242 and 244, respectively, press wheel arm 242 being pivotally attached to mounting plate 334 separately at a lower position with threaded bolt 340 threadedly engaged with the mounting plate, while press wheel arm 244 is pivotally mounted about a spindle 342 and held in position with nut 344 threadedly engaged therewith. Like in the previous embodiments, press wheel arm 242 is biased downwardly using a spring such as the spring 254, deleted here for clarity, press wheel arm 244 being biased downwardly using a spring 345, one end of which winds around spindle 342 and the other end of which engages arm 244.

Turning to FIG. 22, disk bearing assembly 328 includes two bearings 346, a spacer 348 and a dust seal 350, all mounted on spindle 332 and secured in position with a spindle nut 352 threadedly engaged onto a threaded end of spindle 332. The above described components 346–352 are contained in a cylindrical inner cavity 354 of a bearing housing 356, one end of which is covered by a conventional dust cap 358 frictionally engaged with the bearing housing. Bearing housing 356 additionally includes an inner annular flange 360 extending around inner cavity 354 for centering bearings 346 on spindle 342, and a disk mounting flange 362 extending therearound opposite the threaded end thereof, which disk mounting flange 362 includes an array of spaced threaded holes 364. Disk 50 includes a central hole 366 therethrough adapted for receiving bearing housing 356 and an array of counter sunk holes 368 therearound corresponding in location to threaded holes 364, which holes 364 and 368 receive flat head screws 316 for securing disk 50 to disk mounting flange 362. Importantly, as noted above, bearing housing 356 is located in cavity 330 of gauge wheel 52 such that the overall width of opener assembly 326 is reduced by about one half of the width dimension of the bearing housing as measured between the end of the dust cap 358 and plate 334, which like in the case of opener assembly 282, enables the placement of the opener assemblies in much closer spaced side by side relation.

Referring more particularly to FIG. 20, gauge wheel 52 is shown in phantom to reveal a gauge wheel mounting arm 370, one end of which gauge wheel mounting arm 370 mounts for pivotal movement about spindle 342, the opposite end of which has a hole 372 therethrough for receiving a mounting bolt (not shown) for mounting the gauge wheel for rotation to arm 370. A gauge wheel adjusting arm 374 is fixedly attached to gauge wheel mounting arm 370 for rotation therewith about spindle 342 and includes an adjusting pin 376 having one end located in a slot through adjusting arm 374 and an opposite end selectively insertable into a plurality of holes 378 (FIG. 21) of a quadrant 380 mounted above mounting plate 334. Adjusting pin 376 is biased downwardly by a spring (not shown) located in a spring housing 382 on adjusting arm 374, adjusting pin 376 being manually movable upwardly from engagement with quadrant 380 to allow the joint rotation of gauge wheel adjusting arm 374, gauge wheel mounting arm 370 and gauge wheel 52 about spindle 342 as shown by the arrow B for selecting a desired planting depth, pin 376 being insertable into a selected hole 378 and engageable with quadrant 380 for preventing such pivotal movement to thereby select a desired fixed planting depth. It should be noted here that spindle 342, like disk bearing assembly 328, projects into cavity 330 of gauge wheel 52, cavity 330 being large enough such that the gauge wheel is movable throughout a wide adjusting range for changing planting depth without contacting the inner rim of gauge wheel 52.

Figure 23:
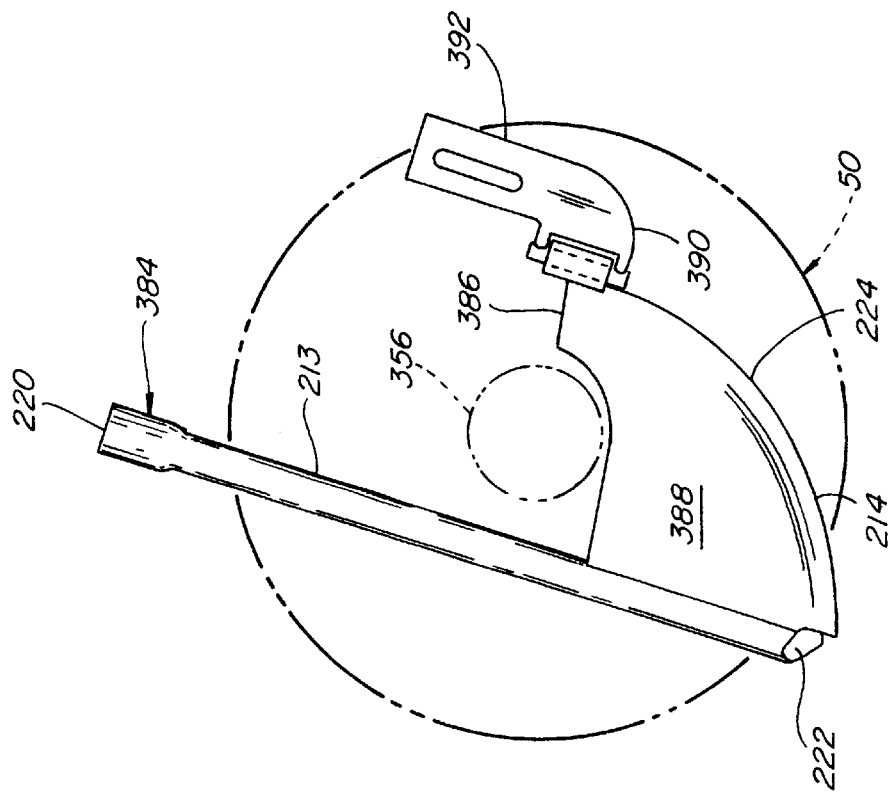
FIG. 23 is an enlarged side view of the seed tube assembly of the unit of FIG. 20, showing the disk 50 in phantom.

Referring also to FIG. 23, opener assembly 326 includes an optional seed tube assembly 384. Seed tube assembly 384, like seed tube assembly 54, includes a seed tube 213, the upper end of which attaches to the bottom end of a seed hose in the conventional manner (FIG. 1) and a seed tube inlet opening 220 for receiving seed from the hose. Seed tube 213 extends between mounting plate 334 and disk 50, and additionally includes an outlet opening 222 for the discharge of seed or other material into a furrow formed by the opener, the outlet opening being angularly oriented as discussed above. Seed tube assembly 384 additionally includes a seed tube runner 214 attached to seed tube 213, which seed tube runner 214 includes a curved leading edge 224 which extends upwardly and forwardly from outlet opening 220 to a top edge 386, and an outer surface 388 which extends from top edge 386 and leading edge 224 to seed tube 213, outer surface 388 serving to prevent loose soil from entering a furrow in advance of seed or other material exiting outlet 222 in the manner described above, and serving to prevent trash and debris from entering and being lodged between the seed tube assembly 214 and bearing housing 356. Additionally, top edge 386 is relatively sharp and serves to scrape and clean the surface of disk 50. Runner 214 further includes a hinged mounting assembly 390 for mounting the seed tube assembly to lower drag arm 336, hinged mounting assembly 390 including a slotted mounting plate 392 hingedly attached to runner 214 and adjustably mountable to lower drag arm 336 using a bolt or bolts in the conventional manner (not shown), an important advantage of which forward hinged mounting location being the ability of the more rearward and lower portions of seed tube assembly 384 to move away from disk 50 to allow the passage of trash and debris therebetween.

Here it should be noted that an additional feature of embodiments 238, 282, and also 326, is the positioning of the pivot point for the adjustable gauge wheel 52 at a location that enables the lower edge of the gauge wheel to remain in at least close proximity to the exit point of the disk 50 from the ground throughout the range of pivotal adjustment, represented by the arrow B in FIG. 20. This is a desirable feature as it minimizes soil disruption cause by the exiting of the disk from the ground, thereby reducing moisture and chemical loss and providing other advantages.

Figure 24:
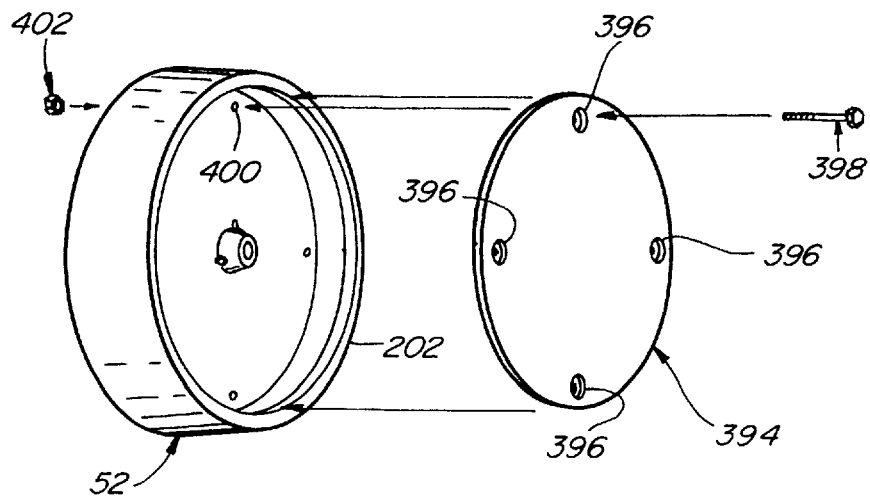
FIG. 24 is an exploded view of gauge wheel 52 showing the installation of an optional hub cap thereon.
Figure 25:
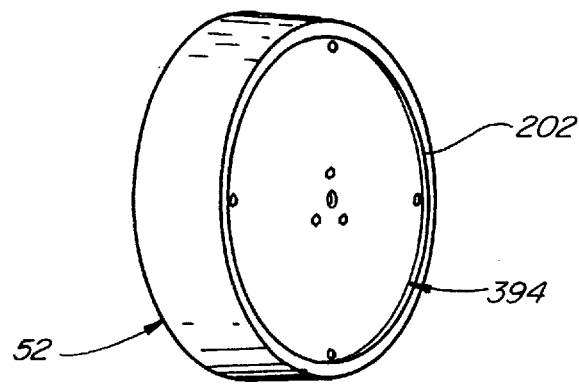
FIG. 25 shows gauge wheel 52 with the hub cap installed thereon.

FIGS. 24 and 25 shown an optional hub cap 394 for installation on gauge wheel 52 to improve material flow between adjacent units. Hub cap 394 is sized and shaped to fit in a recess of outer wheel 202 of gauge wheel 52 and includes a plurality of counterbored holes 396 therethrough. Bolts 398 are insertable through holes 396, and also through holes 400 through wheel 52 and are threadedly engageable with nuts 402 for securing hub cap 394 on wheel 52. Alternatively, it is recognized that numerous other fasteners can be used for attachment of hub cap 394 to wheel 52, including frictional fasteners and the like.

Thus, there has been shown and described planting unit constructions which fulfill all of the objects and advantages sought therefor. It will be apparent to those skilled in the art, however, that many changes, modifications, variations and other uses and applications for the subject planting units are possible and all such changes, modifications, variations and other uses and applications which do not depart from the spirit and scope of the invention are deemed to be covered by the invention which is limited only by the claims which follow.

What is claimed is:

1. An opener assembly movable forwardly over the ground for opening a furrow therein comprising:

a member adapted for connection to an implement adapted for moving the opener assembly over the ground;

a generally flat disk connected to the member for rotation about a disk axis offset at an angle to the direction transverse to the forward direction, the angled disk thus defining forwardly and rearwardly directed disk surfaces, the disk having a lower portion positionable for penetrating the ground for opening the furrow therein and an outer perimeter edge extending around the disk surfaces, the outer perimeter edge defining a disk profile when viewed from the rear direction, a seed tube located adjacent the rearward directed disk surface, the seed tube having a lower end portion located substantially within the rear disk profile and including an outlet opening for discharging material in the furrow located adjacent to the lower portion of the disk; and an extension supported adjacent the seed tube lower end portion and extending forwardly thereof closely adjacent the rearwardly directed disk surface, the extension being shaped and sufficiently narrow so as to be located substantially within the rear disk profile and to move through the furrow for preventing loose soil on the side of the furrow opposite the rearwardly directed disk surface from entering the furrow in advance of material discharged therein through the seed tube outlet opening with only minimal contact with the side of the furrow.

2. The opener assembly according to claim 1 wherein said member adapted for connection to the implement comprises structure for pivotal connection thereto.

3. The opener assembly according to claim 1 wherein the lower disk portion has a curved profile shape when viewed from the rear direction, and the extension has an outer surface having a profile shape when viewed from the rear corresponding at least generally to the curved rear profile shape of the lower disk portion.

4. The opener assembly according to claim 1 wherein the extension further comprises a forwardly and upwardly curved leading edge portion located in at least partial abutting relation to the rearwardly directed disk surface.

5. The opener assembly according to claim 1 wherein the seed tube and the extension are jointly mounted to the opener assembly for hinged movement away from the disk to allow the passage of trash and debris between the jointly mounted seed tube and extension and the disk.

6. The opener assembly according to claim 5 wherein the seed tube and extension are hingedly mounted to the opener assembly at a forward location with respect to the rearwardly directed disk surface.

7. The opener assembly according to claim 6 wherein the seed tube and the extension are jointly mounted for hinged movement about a hinge axis oriented at a no more than a small acute angle to the vertical direction.

8. The opener assembly according to claim 1 wherein the extension further comprises an upper edge portion in abutment to the rearwardly directed disk surface adapted for scraping soil therefrom.

9. The opener assembly according to claim 1 wherein the extension is made substantially of a polymer material.

10. The opener assembly according to claim 1 further comprising a gauge wheel, and means connecting the gauge wheel to the opener assembly for rotation adjacent the forwardly directed surface of the disk about a gauge wheel axis generally parallel to the disk axis to limit the penetration of the lower portion of the disk into the ground.

11. The opener assembly according to claim 10 wherein the gauge wheel is located closely adjacent to the forwardly directed disk surface and the forwardly directed disk surface has a central portion that is substantially flat so as to allow positioning the gauge wheel adjacent thereto for limiting the penetration of the disk into the ground.

12. The opener assembly according to claim 1 wherein the member adapted for connection to the implement further comprises a bearing assembly for rotatably supporting the disk, the bearing assembly being located at least partially within the member.

13. The opener assembly according to claim 10 wherein the gauge wheel has a generally smooth, flat outer surface located opposite the disk.

14. The opener assembly according to claim 1 wherein the opener assembly has an overall transverse width sufficiently small so as to allow connection to the implement in side-by-side, parallel relation with at least one other opener assembly for forming parallel furrows spaced from about six to about seven inches apart.

15. The opener assembly according to claim 10 wherein the means connecting the gauge wheel to the opener assembly includes an elongated arm having a predetermined length and pivotally connected to the opener assembly at a location so as to position the bottom portion of the gauge wheel closely adjacent to a point where the disk edge exits the ground to minimize soil disruption at said point.

16. The opener assembly according to claim 10 wherein the gauge wheel has a cavity adjacent the member adapted for connection to the implement and the disk is mounted for rotation on a bearing assembly located at least partially in said cavity.

17. A single disk opener assembly comprising a generally flat disk supported for forward movement through the ground for forming a furrow therein, said disk having opposite disk surfaces oriented at a small acute angle with respect to the forward direction and an outer peripheral edge extending around the disk surfaces defining a disk profile when viewed from the rear, the outer peripheral edge including a forward edge portion having a lower portion positioned for imparting a shape to one side of said furrow, the disk surfaces including a rearwardly facing disk surface having a lower portion positioned to be located in spaced, opposed relation to said one side of said furrow, said opener assembly further including structure for depositing material in said furrow having an outlet opening located adjacent a rearward portion of said lower portion of said rearwardly facing disk surface, and a member extending forwardly from said structure beside said lower portion of said rearwardly facing disk surface, said member terminating rearwardly of said forward edge and having a shape and a sufficiently small width so as to be located substantially within said disk profile and to pass through said furrow with minimal contact with said one side of the furrow while preventing soil from entering the furrow in advance of material deposited therein through said outlet opening.

18. Apparatus adapted for use with a single disk opener assembly for depositing material in a furrow formed in the ground thereby, the single disk opener assembly having a generally flat disk supported for forward movement through the ground for forming the furrow oriented at a small acute angle with respect to the forward direction, an outer peripheral edge defining a disk shadow when viewed from the rear and including a lower forward portion positioned for imparting a shape to one side of the furrow, and a rearwardly facing lower surface portion positioned to be located in the furrow in spaced opposed relation to said one side thereof, the apparatus comprising:

a member having an inlet opening for receiving the material, a lower outlet opening for discharging the material, a conduit for the passage of the material between the inlet and outlet openings, and a runner adjacent the outlet opening, the member being mountable to the opener assembly with the runner positioned beside the rearwardly facing lower surface portion of said disk, said runner having a sufficiently narrow overall width so as to be located within the disk shadow and including an outer surface portion having a shape conforming closely to the shape of said one side of the furrow so as to substantially occupy the adjacent portion of the furrow to prevent soil from entering the furrow in advance of material discharged therein from the outlet opening with only minimal contact with said one side of the furrow.

19. Apparatus according to claim 18 wherein the runner has a leading edge portion having a downwardly and rearwardly curving shape.

20. Apparatus according to claim 19 wherein the disk has a curved forward most edge and the leading edge portion of the runner has a curved shape corresponding at least generally to a portion of said curved forward most edge.

21. An opener assembly movable forwardly over the ground for opening a furrow therein comprising:

a member adapted for connection to an implement adapted for moving the opener assembly over the ground;

a generally flat disk connected to the member for rotation about a disk axis offset at an angle to the direction transverse to the forward direction, the angled disk thus defining forwardly and rearwardly directed disk surfaces, the disk having a lower portion positionable for penetrating the ground for opening the furrow therein and an outer perimeter edge extending around the disk surfaces, the outer perimeter edge defining a disk profile when viewed from the rear direction, a seed tube located adjacent the rearward directed disk surface, the seed tube having a lower end portion including an outlet opening for discharging material in the furrow located adjacent to the lower portion of the disk; and an extension supported adjacent the seed tube lower end portion and extending forwardly thereof closely adjacent the rearwardly directed disk surface, the extension being located substantially within the rear disk profile and adapted for preventing loose soil on the side of the furrow opposite the rearwardly directed disk surface from entering the furrow in advance of material discharged therein through the seed tube outlet opening, the seed tube and extension being jointly mounted to the opener assembly for hinged movement away from the disk to allow the passage of trash and debris between the jointly mounted seed tube and extension and the disk.

22. The opener assembly according to claim 21 wherein the seed tube and extension are hingedly mounted to the opener assembly at a forward location with respect to the rearwardly directed disk surface.

23. The opener assembly according to claim 22 wherein the seed tube and extension are jointly mounted for hinged movement about a hinge axis oriented at no more than a small acute angle to the vertical direction.

* * * * *